(12) United States Patent  
Komine

(10) Patent No.: US 6,249,522 B1
(45) Date of Patent: Jun. 19, 2001

(54) PATH MERGING TYPE COMMUNICATION APPARATUS, METHOD THEREOF, AND STORAGE MEDIUM THEREOF

(75) Inventor: Hiroaki Komine, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/046,352

(22) Filed: Mar. 23, 1998

(30) Foreign Application Priority Data

Oct. 17, 1997 (JP) .................................................. 9-285904

(51) Int. Cl.$^7$ ............................. H04L 12/28; H04L 12/56
(52) U.S. Cl. ........................... 370/399; 370/397; 370/410
(58) Field of Search .................................... 370/397, 398, 370/399, 410, 426, 429, 431, 395, 392, 396, 250, 254, 265

(56) References Cited

U.S. PATENT DOCUMENTS 5,568,475 * 10/1996 Doshi et al. ......................... 370/58.2
5,570,361 * 10/1996 Norizuki et al. ..................... 370/60.1
5,627,819 * 5/1997 Dev et al. ............................. 370/250
6,097,726 * 8/2000 Puntambekar et al. .............. 370/397

FOREIGN PATENT DOCUMENTS 290834  3/1990  (JP) .

* cited by examiner

*Primary Examiner*—Huy D. Vu
*Assistant Examiner*—M. Phan
(74) *Attorney, Agent, or Firm*—Helfgott & Karas, P.C.

(57) ABSTRACT

A path merging type communication apparatus comprises a leaf interface unit, a root interface unit, a controlling unit, and a converting unit. The leaf interface unit and the root interface unit interface with air ATM communication unit or an ATM terminal unit. The controlling unit controls each structural unit of the apparatus. The converting unit merges input ATM cells and switches them. The converting unit adds input path identification information (such as a VPI and a VCI contained in an input ATM cell) and an intra-apparatus header (that contains a leaf IF unit number of the leaf interface unit to which the cell has been input) to the ATM cell and generates an output ATM cell.

25 Claims, 22 Drawing Sheets

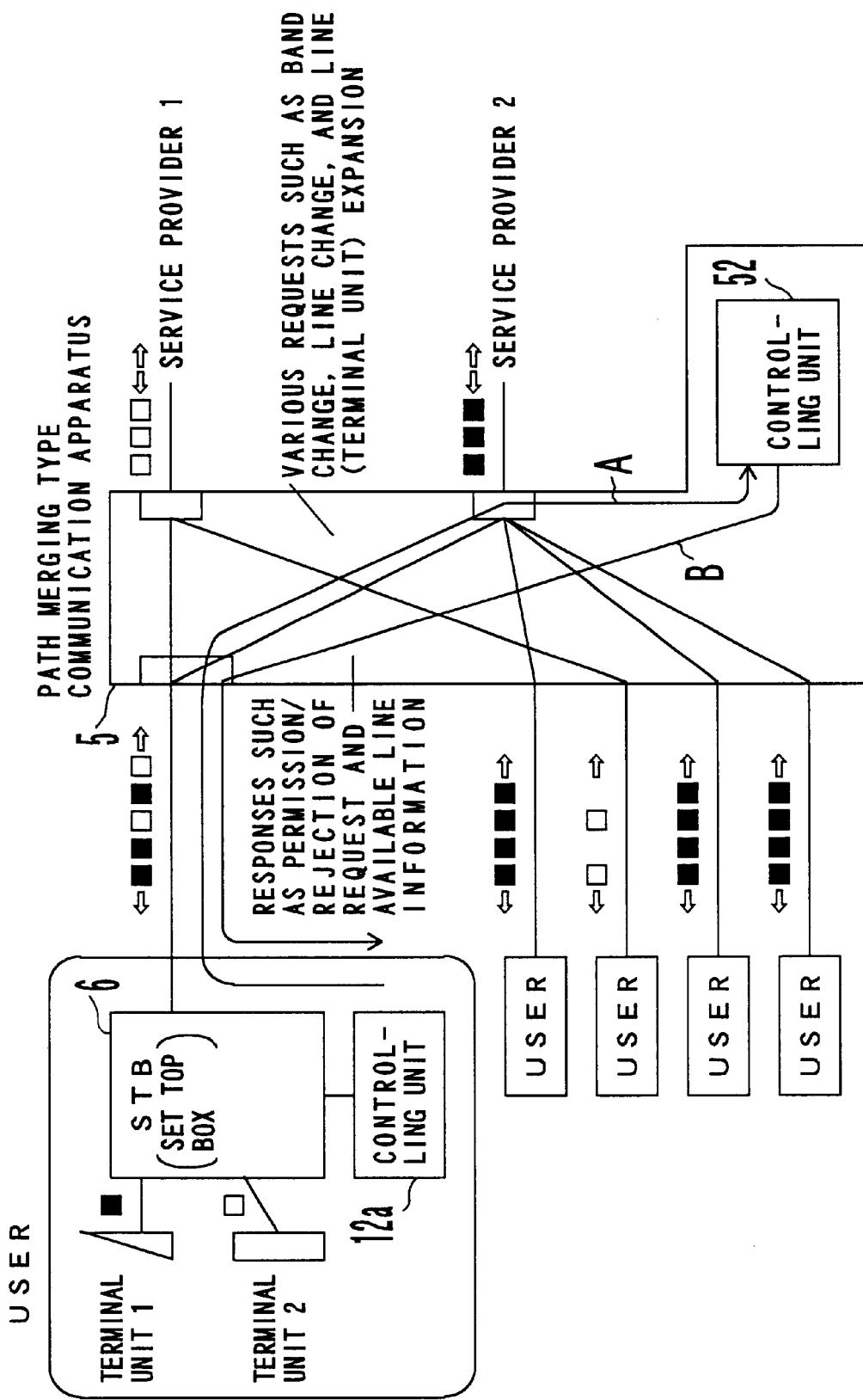
F I G. 5

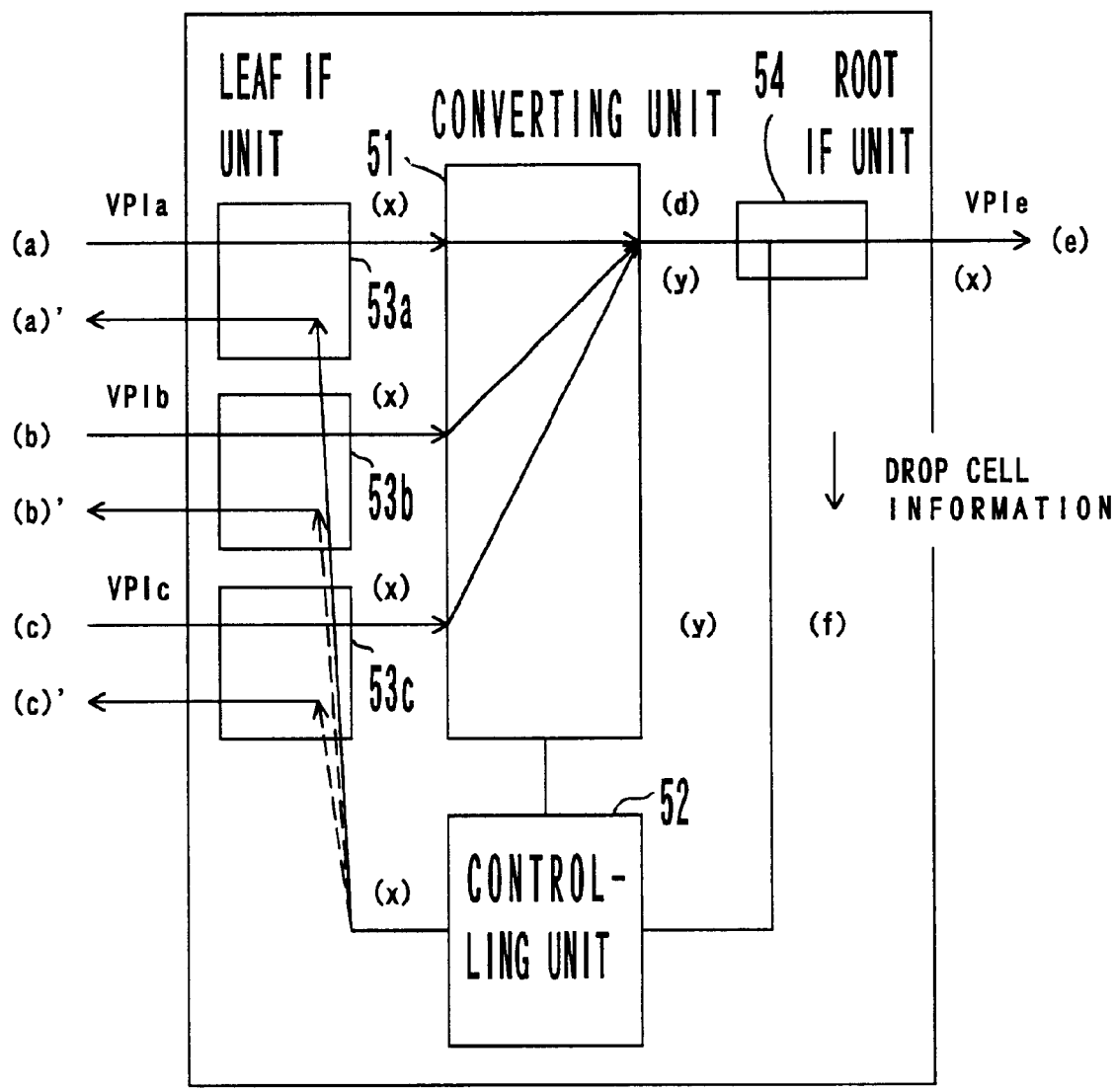
F I G. 6

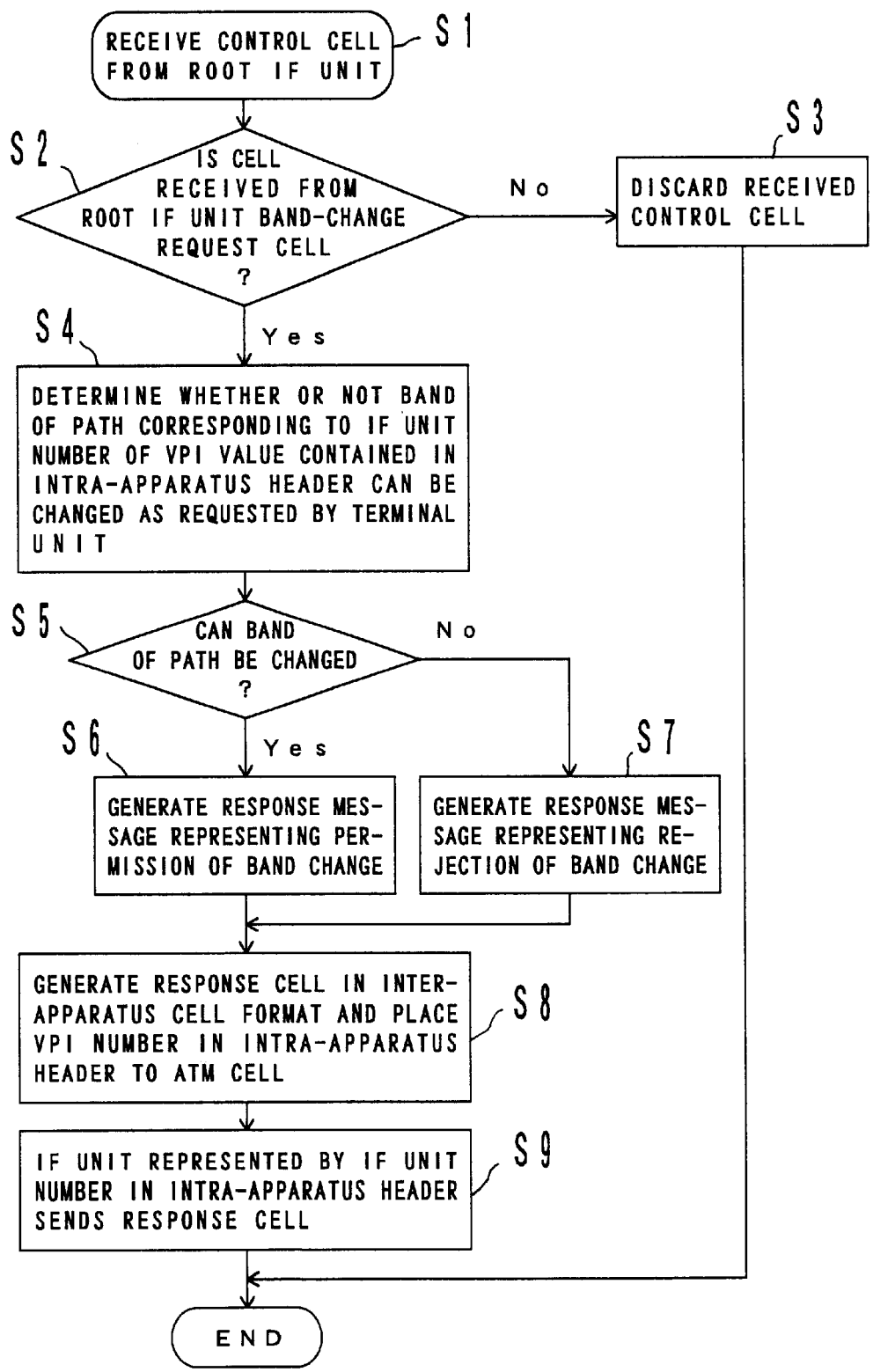
F I G. 9

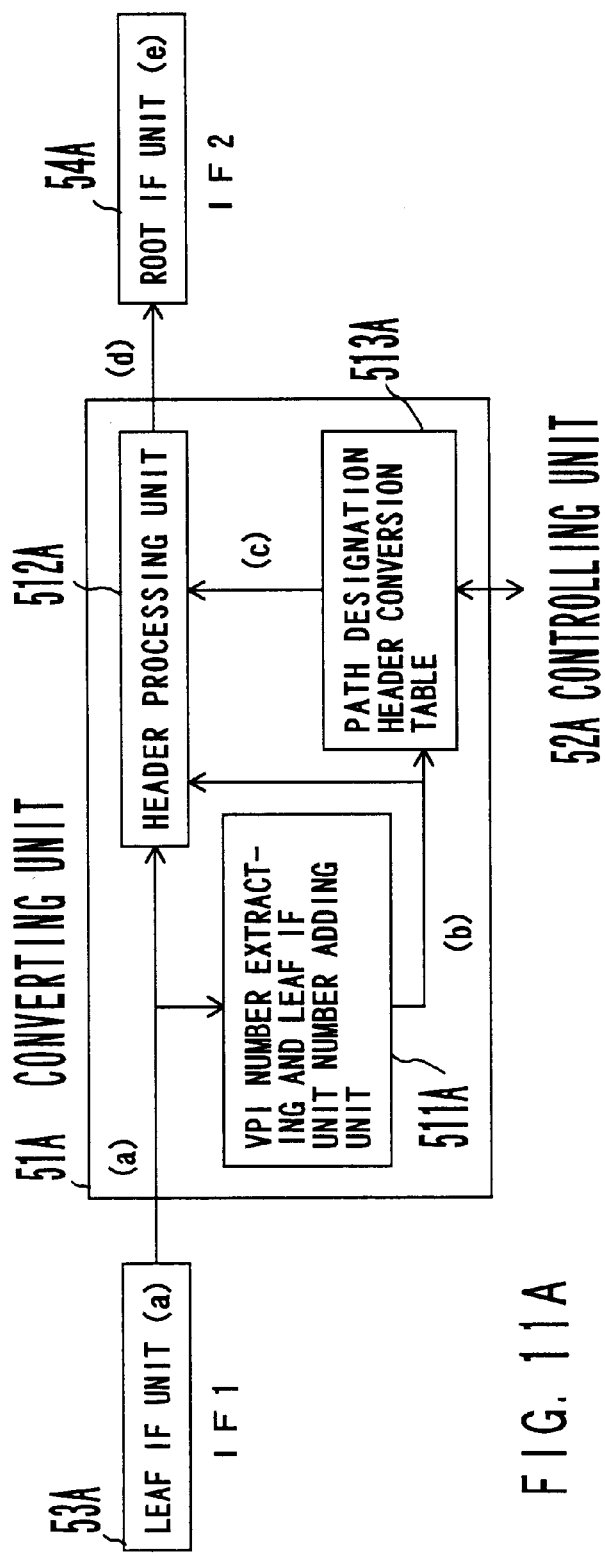
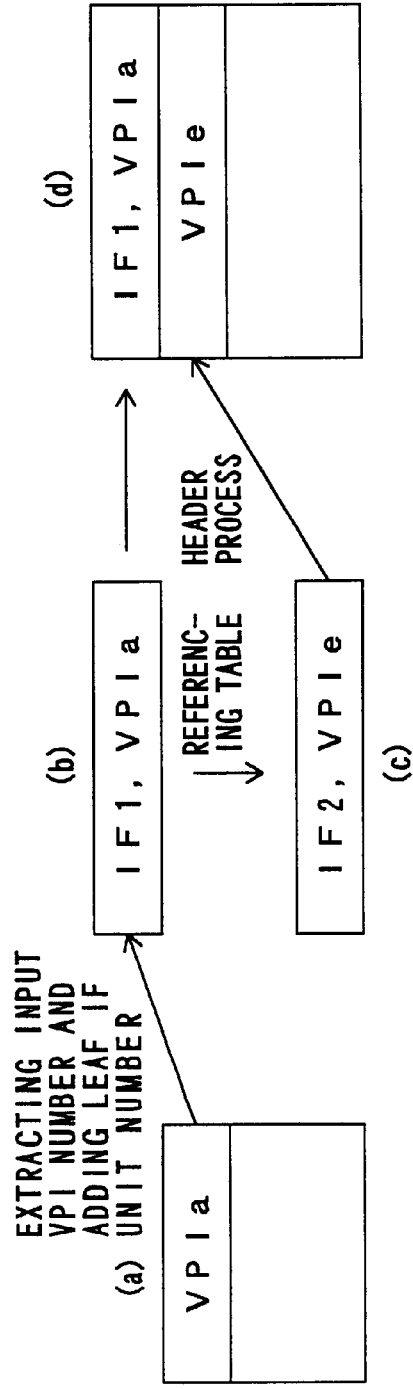
FIG. 11A
FIG. 11B

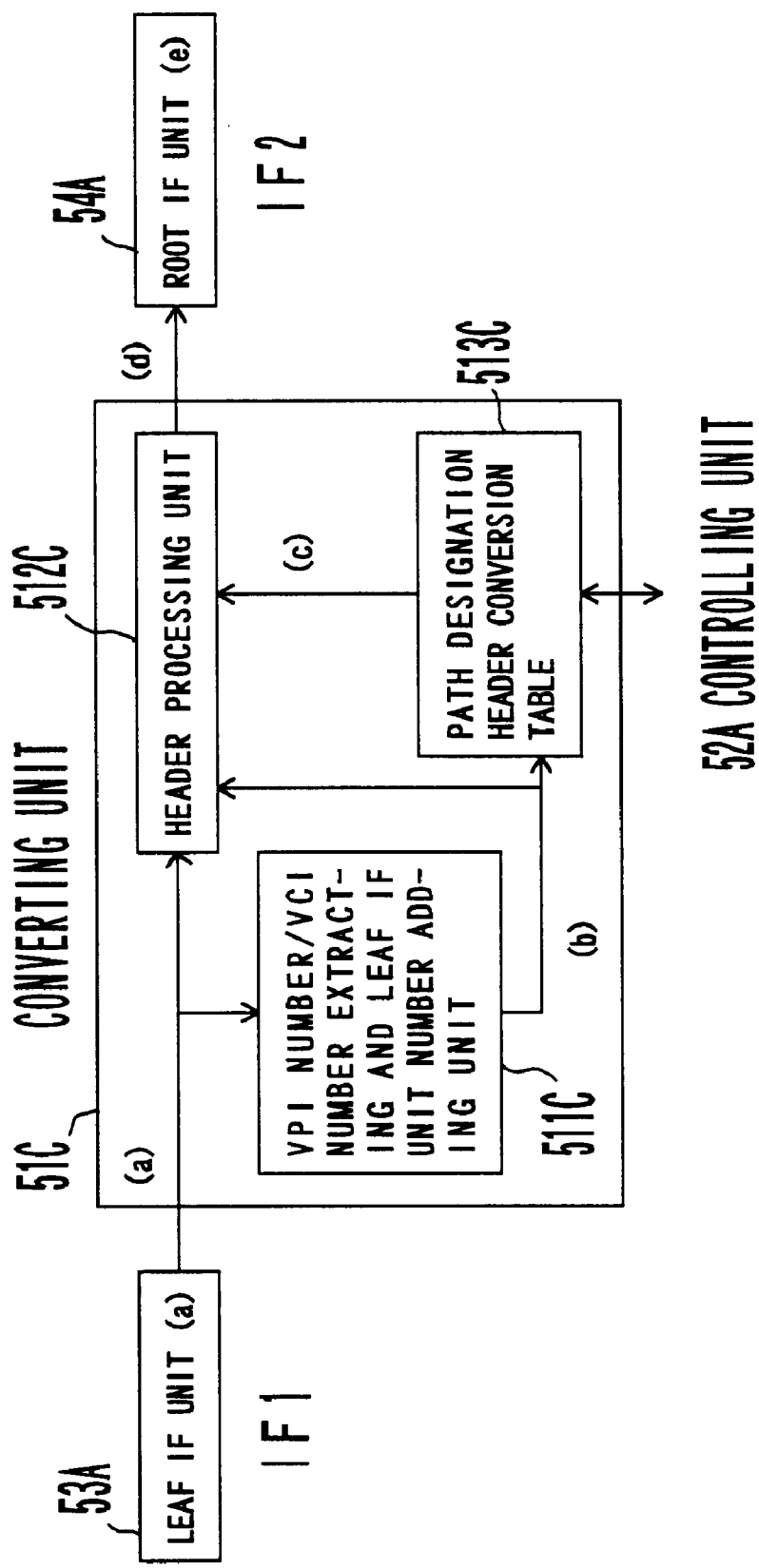
F I G. 1 3

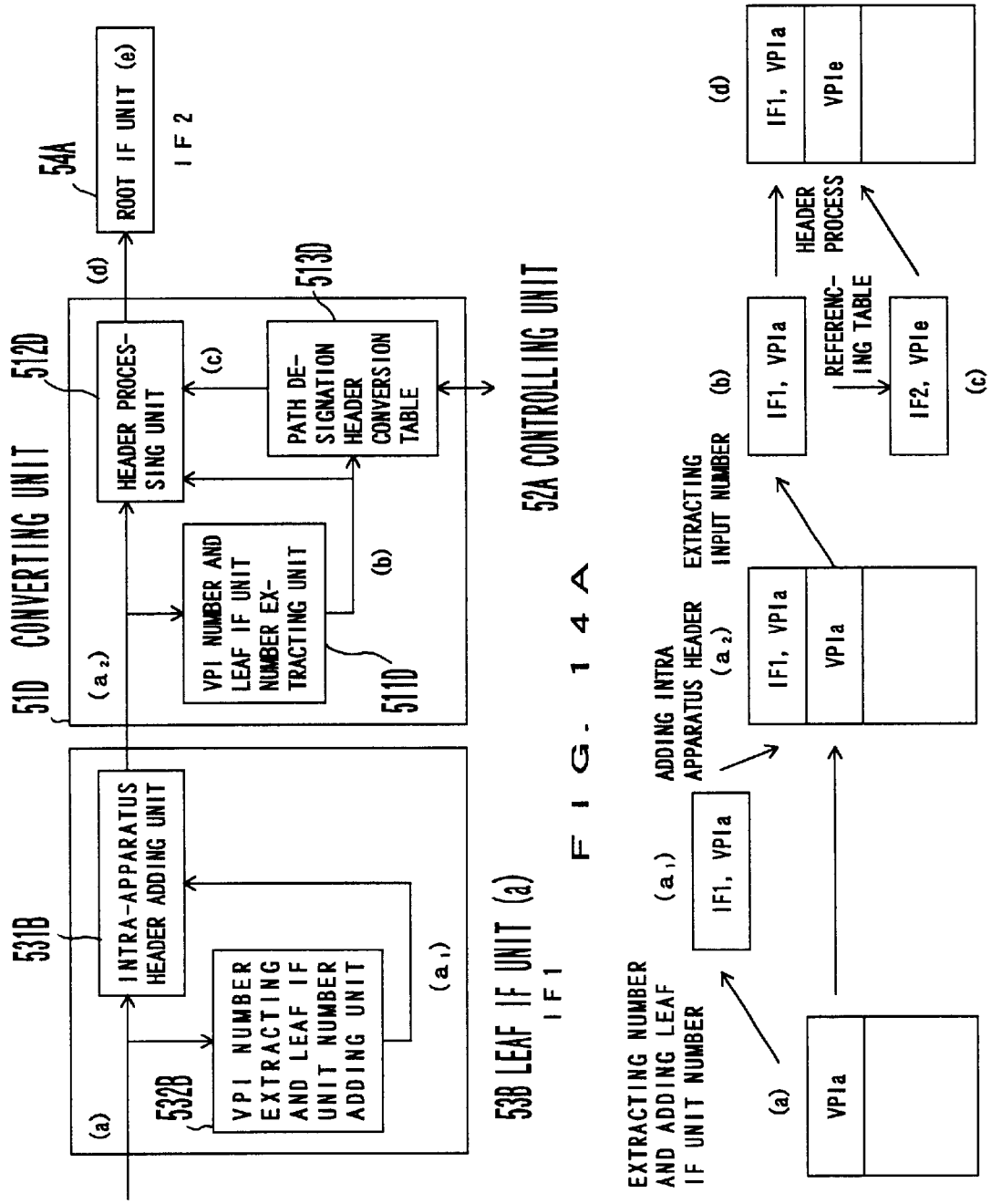

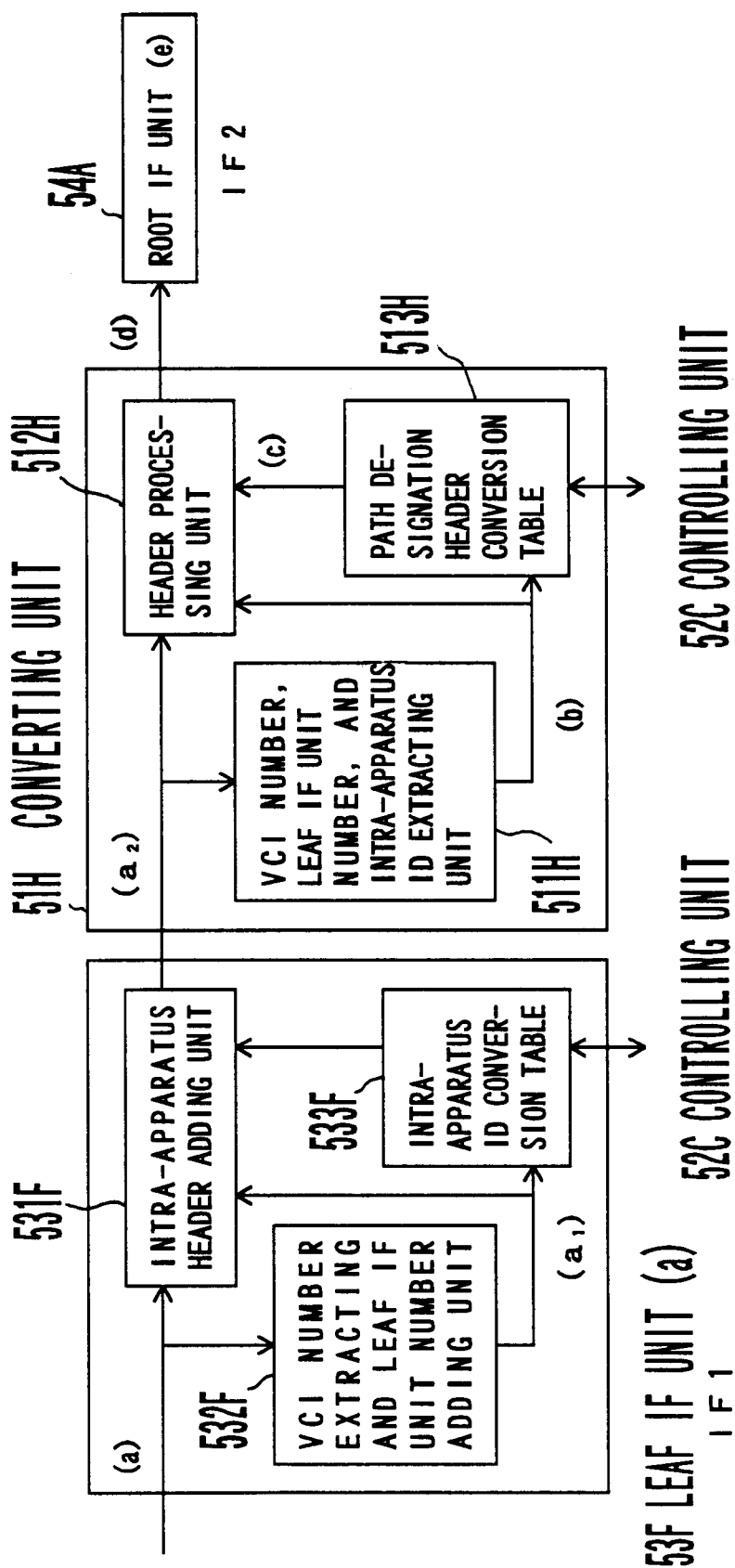
F I G. 1 8

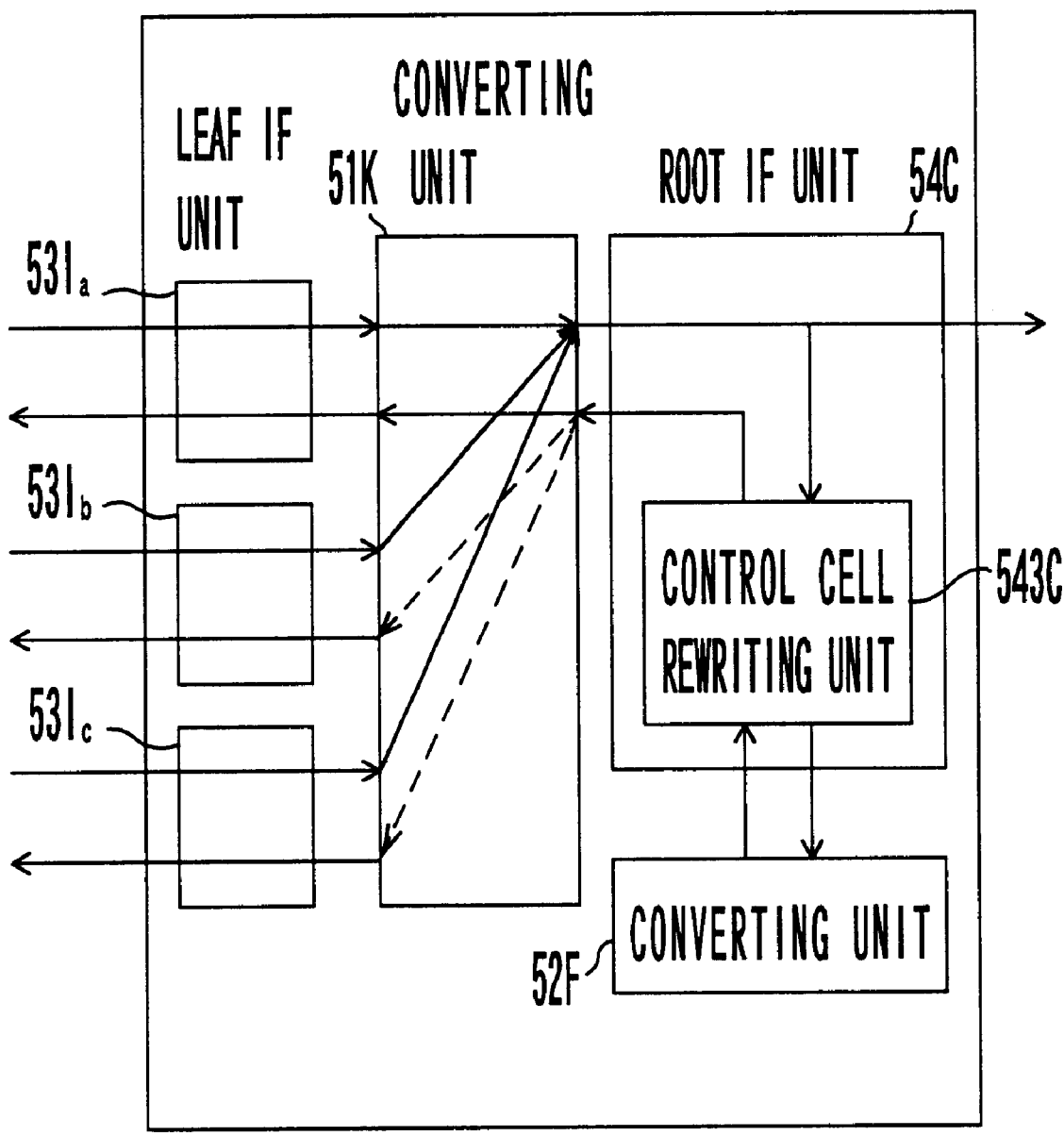
F I G. 2 1

PATH MERGING TYPE COMMUNICATION APPARATUS, METHOD THEREOF, AND STORAGE MEDIUM THEREOF

BACKGROUND OF THE INVENTION

1. Field of the Invention

The present invention relates to a communication controlling process for an ATM (Asynchronous Transfer Mode) communication unit, in particular, to a path merging type communication apparatus for storing particular information contained in a pre-merged ATM cell and accomplishing a one-to-one bidirectional communication with a sender thereof in an N-to-one merging communication (where N is an integer larger than 2), a method for path marging type communication, and a storage medium storing the program which accomplishes the method.

2. Description of the Related Art

FIG. 1 shows an example of the structure of a network of an ATM switching system having a conventional ATM communication unit. FIG. 2 shows an example of the structure of the ATM communication unit. FIG. 3 shows data flows switched by the ATM switching system. The conventional ATM communication unit 8 shown in FIG. 1 is connected to other ATM communication units or ATM terminal units (or terminal units having ATM functions) (9a to 9d, 10, and 11). The conventional ATM communication unit 8 provides a one-to-one mutual communication from the unit 9d to the unit 11. In addition, the conventional ATM communication unit 8 provides an N-to-one merging communication from the units 9a, 9b, and 9c to the unit 10. In contrast, the conventional ATM communication unit 8 provides a broadcasting communication from the unit 10 to the units 9a, 9b, and 9c. The ATM communication unit 8 merges data received from the units 9a, 9b, and 9c and send the merged data to the unit 10 through one connection. The unit 10 sends the same data to the units 9a, 9b, and 9c through the ATM communication unit 8.

FIG. 2 shows the structure of the ATM communication unit 8. The ATM communication unit 8 comprises interface units (IFs) 83 and 84, a converting unit (SW) 81, and a controlling unit 82. The interface units 83 and 84 interface with each link. The converting unit 81 switches paths and channels. The controlling unit 82 controls processes for various requests (band change, line change, line expansion, and so forth) to the ATM communication unit 8. The interface units 83 and 84 comprise sending units (83s and 84s) and receiving units (83r and 83r) and can function as a leaf IF unit or a root IF unit.

The ATM system is basically a connection type data switching system. The ATM system transmits information with cells (the size of each cell is 53 bytes, fixed). At present time, each ATM communication unit connected as a network simply transmits information signals. However, in near future, services that require cooperation of each ATM communication unit will be provided. To do that, control information should be exchanged between each ATM communication unit. In each ATM communication unit, as with information signals, control signals are transmitted with cells.

A 53-byte cell is composed of a five-byte header and a 48-byte payload. The 48-byte payload stores user information. The five-byte header contains information such as a virtual path identifier (VPI), a virtual channel identifier (VCI), and a priority level. The VPI and VCI are used to identify a virtual path connection and a virtual channel connection in an ATM communication, respectively. The VPI is an identifier for identifying as a path a connection that is a part of one optical transmission link and that is statically assigned. In contrast, the VCI is an identifier for identifying as a channel a connection that is dynamically assigned in a particular VPI.

When the ATM communication unit receives a cell, it determines an input link thereof (leaf interface (IF)), an output link (root IF unit) corresponding to the header of the cell, and an output header using an internal conversion table. The ATM communication unit converts the header of the cell into the obtained header, and outputs the resultant cell to the output link. Such a switching operation is performed at very high speed by hardware or the like. To further increase the transmission speed, however, the contents of the header is limited. For example, the header does not contain the address of the terminal unit of the sender of the cell. When a cell is switched, the VPI and VCI contained in the header of the cell from the sender are substituted with a VPI and a VCI assigned to a virtual connection (VPC and VCC) between the ATM communication unit and the destination (including an intermediate ATM communication unit). Thus, in the network structure of which input data are merged by an ATM communication unit, it is impossible to determine information of input paths of pre-merged cells (the VPI and the VCI that have not been converted) and sender units of the cells from information of the merged cell.

As described above, according to the conventional method, with information of a merged cell, information of each pre-merged connection cannot be obtained. Even if a response to a particular pre-merged connection is required, a message should be sent to all connections. FIG. 3 shows an example of a data switching operation of the conventional ATM communication unit. When a controlling unit 12a of a set top box (STB) 12 connected to a terminal unit 1 that is an ATM communication unit sends an ATM cell (control cell) that contains a request (for example, a request for increasing the communication capacity of a service to a service provider 2) to an ATM communication unit 8, the ATM cell is merged with other ATM cells sent from other users. Thereafter, the merged cells reach the controlling unit 82 as denoted by an arrow A. At this point, sender information (namely, information with respect to a connection with the set top box (STB) 12 connected to the terminal unit 1) is lost. Thus, when the ATM communication unit 8 sends to the terminal unit 1 a response against the request sent from the terminal unit 1 (the response is for example permission/rejection of the request and available band), although only the terminal unit 1 requires the response, since the controlling unit 82 of the ATM communication unit 8 cannot obtain the information with respect to the connection to the STB 12, the controlling unit 82 sends the response to all the available connections.

For example, in a video conference application, while video data and audio data are being sent with a channel (VC) 1 and a channel (VC) 2, the band width of the channel (VC) 1 may be increased due to necessity of detailed video information. With a conventional ATM communication unit, a request for dynamically increasing the band of a particular channel can be issued with a control cell. As described above, however, after the control cell is merged with other cells, since the VPI and VCI for identifying the sender of the control cell and the connection with the ATM communication unit are lost, the sender of the control cell cannot be identified. Thus, information that represents the response against the request and the available band cannot be sent back to the sender. Thus, the response against the request is sent to all hardware units (all ATM communication units or terminal units with ATM functions) connected to the ATM communication unit that has sent the request as broadcasting type communication (communication flow denoted by an arrow with a dotted line shown in FIG. 1). Consequently, various problems such as the increase of loads of ATM terminal units and set top boxes, the increase of the traffic of the network, and leakage of information take place.

SUMMARY OF THE INVENTION

An object of the present invention is to solve the above-described problems by using a structure for extracting information such as a VPI, VCI, and a leaf IF unit from the header of an ATM cell received from a sender of a request, holding the extracted information, and using the information when a response to the request is sent to the sender.

To solve the above-described problems, a first aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the converting unit comprises an input path information extracting unit for extracting input path identification information and a leaf IF unit number for identifying a leaf IF unit from which the input ATM cell is received from the input ATM cell, a path designation header conversion table for converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the input ATM cell to the output path identification information obtained from the path designation header conversion table, adding an intra-apparatus header containing the input path identification information and the leaf IF unit number to the input ATM cell, generating an output ATM cell, and sending the output ATM cell to the root IF unit with the root IF unit number obtained from the path designation header conversion table, wherein the root IF unit comprises a control cell detecting unit for detecting an output ATM cell that contains a control cell to be sent to the controlling unit from output ATM cells that are received from the converting unit and sending the detected output ATM cell to the controlling unit, and an intra-apparatus header removing unit for removing the intra-apparatus header from the output ATM cell received from the converting unit and sending the resultant ATM cell to a path in which the ATM cell is merged, and wherein the controlling unit performs a process corresponding to information of the control cell in the output ATM cell received from the root IF unit, generates a response cell that contains the input path identification information and information of the process result corresponding to the input path identification information and the leaf IF unit number contained in the intra-apparatus header of the control cell, and sends the response cell to a leaf IF unit having the leaf IF unit number so as to send the response cell to a path identified by the input path identification information. Thus, the path merging type communication apparatus can identify a pre-merged path and send a response to an upstream unit that has sent a control cell as one-to-one communication.

A second aspect of the present invention is the path merging type communication apparatus of the first aspect, wherein the input path identification information is an input VPI number, wherein the output path identification information is an output VPI number, and wherein the path information storing area is a VPI area in an ATM header. Thus, the path merging type communication apparatus can identify a pre-merged path for each path (virtual path) and communicate with an upstream unit through the identified path for a control operation.

A third aspect of the present invention is the path merging type communication apparatus of the first aspect, wherein the input path identification information is an input VCI number, wherein the output path identification information is an output VCI number, and wherein the path information storing area is a VCI area in an ATM header. Thus, the path merging type communication apparatus can identify a pre-merged path for each channel (virtual channel) and communicate with an upstream unit through the identified path for a control operation.

A fourth aspect of the present invention is the path merging type communication apparatus of the first aspect, wherein the input path identification information is an input VPI number and an input VCI number, wherein the output path identification information is an output VPI number and an output VCI number, and wherein the path information storing area is a VPI area and a VCI area in an ATM header. Thus, the path merging type communication apparatus can identify a pre-merged path for each channel (virtual channel) accommodated in a path (virtual path) and communicate with an upstream unit through the identified path for a control operation.

A fifth aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the leaf IF unit comprises an input path information extracting unit for extracting input path identification information and a leaf IF unit number for identifying a leaf IF unit from which an input ATM cell is received from the input ATM cell, and an intra-apparatus header adding unit for adding an intra-apparatus header containing the input path identification information and the leaf IF unit number to the input ATM cell, generating an intra-apparatus ATM cell, and sending the intra-apparatus ATM cell to the converting unit, wherein the converting unit comprises an input path identification information extracting unit for extracting the input path identification information and the leaf IF unit number from an intra-apparatus header of the input intra-apparatus ATM cell, a path designation header conversion table for converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the intra-apparatus ATM cell to output path identification information obtained from the path designation header conversion table, converting the intra-apparatus ATM cell into an output ATM cell, and sending the output ATM cell to the root IF unit having a root IF unit number obtained from the path designation header conversion table, wherein the root IF unit comprises a control cell detecting unit for detecting an output ATM cell that contains a control cell to be sent to the controlling unit from output ATM cells that are received from the converting unit and sending the detected output ATM cell to the controlling unit, and an intra-apparatus header removing unit for removing the intra-apparatus header from the output ATM cell received from the converting unit and sending the resultant ATM cell to a path in which the ATM cell is merged, and wherein the controlling unit performs a process corresponding to information of the control cell in the output ATM cell received from the root IF unit, generates a response cell that contains the input path identification information and information of the process result corresponding to the input path identification information and the leaf IF unit number contained in the intra-apparatus header of the control cell, and sends the response cell to a leaf IF unit having the leaf IF unit number so as to send the response cell to a path identified by the input path identification information. Thus, since the leaf IF unit can perform the intra-apparatus header adding process, the structure of the converting unit of the path merging type communication apparatus can be simplified.

A sixth aspect of the present invention is the path merging type communication apparatus of the fifth aspect, wherein the input path identification information is an input VPI number, wherein the output path identification information is an output VPI number, and wherein the path information storing area is a VPI area in an ATM header. Thus, the path merging type communication apparatus can identify a pre-merged path for each path (virtual path) and communicate with an upstream unit through the identified path for a control operation.

A seventh aspect of the present invention is the path merging type communication apparatus of the fifth aspect, wherein the input path identification information is an input VCI number, wherein the output path identification information is an output VCI number, and wherein the path information storing area is a VCI area in an ATM header. Thus, the path merging type communication apparatus can identify a pre-merged path for each channel (virtual channel) and communicate with an upstream unit through the identified path for a control operation.

An eighth aspect of the present invention is the path merging type communication apparatus of the fifth aspect, wherein the input path identification information is an input VPI number and an input VCI number, wherein the output path identification information is an output VPI number and an output VCI number, and wherein the path information storing area is a VPI area and a VCI area in an ATM header. Thus, the path merging type communication apparatus can identify a pre-merged path for each channel (virtual channel) accommodated in a path (virtual path) and communicate with an upstream unit through the identified path for a control operation.

A ninth aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the leaf IF unit comprises a first input path information extracting unit for extracting input path identification information and a leaf IF unit number for identifying a leaf IF unit from which the input ATM cell is received from the input ATM cell, an intra-apparatus ID conversion table for converting the extracted input path identification information and leaf IF unit number into an intra-apparatus ID, and an intra-apparatus header adding unit for rewriting the input path identification information contained in a path information storing area of the input ATM cell to the intra-apparatus ID obtained from the intra-apparatus ID conversion table, adding an intra-apparatus header containing the extracted input path identification information and leaf IF unit number to the input ATM cell, generating an intra-apparatus ATM cell, and sending the intra-apparatus ATM cell to the converting unit, wherein the converting unit comprises a second input path information extracting unit for extracting input path identification information, the leaf IF unit number, and the intra-apparatus ID from the input intra-apparatus ATM cell, a path designation header conversion table for converting the extracted intra-apparatus ID into output path identification information for identifying an output designation of an output ATM cell and a root IF unit number of the root IF unit to which the output ATM cell is sent, and a header processing unit for rewriting the intra-apparatus ID contained in a path information storing area of the intra-apparatus ATM cell to the output path identification information obtained from the path designation header conversion table, generating an output ATM cell, and sending the output ATM cell to the root IF unit having the root IF unit number obtained from the path designation header conversion table, wherein the root IF unit comprises a control cell detecting unit for detecting an output ATM cell that contains a control cell to be sent to the controlling unit from output ATM cells that contain the intra-apparatus header and are received from the converting unit and sending the detected output ATM cell to the controlling unit, and an intra-apparatus header removing unit for removing the intra-apparatus header from the output ATM cell received from the converting unit and sending the resultant ATM cell to a path in which the ATM cell is merged, and wherein the controlling unit performs a process corresponding to information of the control cell in the output ATM cell received from the root IF unit, generates a response cell that contains the input path identification information and information of the process result corresponding to the input path identification information and the leaf IF unit number contained in the intra-apparatus header of the control cell, and sends the response cell to a leaf IF unit having the leaf IF unit number so as to send the response cell to a path identified by the input path identification information. Thus, the path merging type communication apparatus can search the content of the path designation header conversion table with the intra-apparatus ID.

A tenth aspect of the present invention is the path merging type communication apparatus of the ninth aspect, wherein the bit length of the intra-apparatus ID is smaller than the bit length of the input path identification information. Thus, since the path merging type communication apparatus stores the intra-apparatus ID whose bit length is smaller than the conventional input path information in the path designation header conversion table, the capacity of the table can be decreased.

An eleventh aspect of the present invention is the path merging type communication apparatus of the ninth aspect, wherein the input path identification information is an input VPI number, wherein the output path identification information is an output VPI number, and wherein the path information storing area is a VPI area in an ATM header. Thus, the path merging type communication apparatus can identify a pre-merged path for each path (virtual path) and communicate with an upstream unit through the identified path for a control operation.

A twelfth aspect of the present invention is the path merging type communication apparatus of the ninth aspect, wherein the input path identification information is an input VCI number, wherein the output path identification information is an output VCI number, and wherein the path information storing area is a VCI area in an ATM header. Thus, the path merging type communication apparatus can identify a pre-merged path for each channel (virtual channel) and communicate with an upstream unit through the identified path for a control operation.

A thirteenth aspect of the present invention is the path merging type communication apparatus of the ninth aspect, wherein the input path identification information is an input VPI number and an input VCI number, wherein the output path identification information is an output VPI number and an output VCI number, and wherein the path information storing area is a VPI area and a VCI area in an ATM header. Thus, the path merging type communication apparatus can identify a pre-merged path for each channel (virtual channel) accommodated in a path (virtual path) and communicate with an upstream unit through the identified path for a control operation.

A fourteenth aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the converting unit comprises an input path information extracting unit for extracting input path identification information and a leaf IF unit number for identifying a leaf IF unit from which the input ATM cell is received from the input ATM cell, a path designation header conversion table for converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the input ATM cell to the output path identification information obtained from the path designation header conversion table, adding a first intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises, a control cell detecting unit for detecting an output ATM cell that contains a control cell to be sent to the controlling unit from output ATM cells that contain the first intra-apparatus header and are received from the converting unit and sending the detected output ATM cell to the controlling unit, and an intra-apparatus header removing unit for removing the first intra-apparatus header from the output ATM cell received from the converting unit and sending the resultant ATM cell to a path in which the ATM cell is merged, wherein the controlling unit performs a process corresponding to information of the control cell in the output ATM cell received from the root IF unit, generates a first response cell that contains information of the process result that is the input path identification information contained in a path information storing area corresponding to the input path identification information and a leaf IF unit number contained in the first intra-apparatus header added to the control cell, adds a second intra-apparatus header that contains the leaf IF unit number and predetermined routing command information to the first response cell, generates a second response cell, and sends the second response cell to the root IF unit, wherein the root IF unit sends the second response cell to the converting unit after receiving the second response cell, and wherein the converting unit sends the first response cell to a leaf IF unit identified by the leaf IF unit number corresponding to the predetermined routing command information and a leaf IF unit number contained in the second intra-apparatus header of the second response cell after receiving the second response cell so as to send the response cell to a path identified by the input path identification information. Thus, the path merging type communication apparatus can identify a pre-merged path and send a response to an upstream unit that has sent a control cell as one-to-one communication.

A fifteenth aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the converting unit comprises an input path information extracting unit for extracting input path identification information and a leaf IF unit number for identifying a leaf IF unit from which the input ATM cell is received from the input ATM cell, a path designation header conversion table for converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the input ATM cell to the output path identification information obtained from the path designation header conversion table, adding a first intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises a control cell detecting unit for detecting an output ATM cell that contains a control cell to be sent to the controlling unit from output ATM cells that contain the first intra-apparatus header and are received from the converting unit and sending the detected output ATM cell to the controlling unit, and an intra-apparatus header removing unit for removing the intra-apparatus header from the output ATM cell received from the converting unit and sending the resultant ATM cell to a path in which the ATM cell is merged, wherein the controlling unit performs a process corresponding to information of the control cell in the output ATM cell received from the root IF unit, generates a first response cell that contains information of the process result that is the input path identification information contained in a path information storing area corresponding to the input path identification information and a leaf IF unit number contained in the first intra-apparatus header added to the control cell, adds a second intra-apparatus header that contains the leaf IF unit number, the input path identification information, and predetermined routing command information to the first response cell, generates a second response cell, and sends the second response cell to the root IF unit, wherein the root IF unit sends the second response cell to the converting unit after receiving the second response cell, wherein the converting unit sends the first response cell to a leaf IF unit identified by the leaf IF unit number corresponding to the predetermined routing command information and a leaf IF unit number contained in the second intra-apparatus header of the second response cell after receiving the second response cell, and wherein the leaf IF unit sends the second response cell to a path identified by the input path identification information contained in the second intra-apparatus header after receiving the second response cell. Thus, the path merging type communication apparatus can identify a pre-merged path and send a response to an upstream unit that has sent a control cell as one-to-one communication.

A sixteenth aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the converting unit comprises an input path information extracting unit for extracting input path identification information and a leaf IF unit number for identifying a leaf IF unit from which the input ATM cell is received from the input ATM cell, a path designation header conversion table for converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the input ATM cell to the output path identification information obtained from the path designation header conversion table, adding an intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises a control cell detecting unit for detecting an output ATM cell that contains a control cell from output ATM cells that are received from the converting unit and sending the detected output ATM cell to the control cell rewriting unit, an intra-apparatus header removing unit for removing the intra-apparatus header from the output ATM cell received from the converting unit and sending the resultant ATM cell to a path in which the ATM cell is merged, and a control cell rewriting unit for sending only information for controlling the path merging type communication apparatus of the information contained in the control cell to the controlling unit, storing input path identification information and a leaf IF unit number contained in an intra-apparatus header of the control cell, receiving information against the control result from the controlling unit, generating a first response cell containing the leaf IF unit number, the input path identification information, and information of the process result corresponding to information of the received control result and the input path identification information and the leaf IF unit number contained in the intra-apparatus header, and sending the first response cell to a leaf IF unit identified by the leaf IF unit number through the converting unit, wherein the controlling unit performs a process corresponding to the control information received from the control cell rewriting unit and sends the control result to the control cell rewriting unit, and wherein the leaf IF unit sends a second response cell of which the leaf IF unit number is removed from the first response cell to a path identified by the input path identification information. Thus, the path merging type communication apparatus can identify a pre-merged path and send a response to an upstream unit that has sent a control cell as one-to-one communication.

A seventeenth aspect of the present invention is a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the converting unit comprises an input path information extracting unit for extracting input path identification information and a leaf IF unit number for identifying a leaf IF unit from which the input ATM cell is received from the input ATM cell, a path designation header conversion table for converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the input ATM cell to the output path identification information obtained from the path designation header conversion table, adding an intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises a control cell detecting unit for detecting an output ATM cell that contains a control cell from output ATM cells that are received from the converting unit and sending the detected output ATM cell to the control cell rewriting unit, an intra-apparatus header removing unit for removing the intra-apparatus header from the output ATM cell received from the converting unit and sending the resultant ATM cell to a path in which the ATM cell is merged, and a control cell rewriting unit for sending only information for controlling the path merging type communication apparatus of the information contained in the control cell to the controlling unit, storing input path identification information and a leaf IF unit number contained in an intra-apparatus header of the control cell, receiving information against the control result from the controlling unit, generating a first response cell containing the leaf IF unit number, the input path identification information, and information of the process result corresponding to information of the received control result and the input path identification information and the leaf IF unit number contained in the intra-apparatus header, and sending the first response cell to the converting unit, wherein the controlling unit performs a process corresponding to the control information received from the control cell rewriting unit and sends the control result to the control cell rewriting unit, and wherein the converting unit sends a second response of which the leaf IF unit number is removed from the first response cell to a leaf IF unit identified by the leaf IF unit number so as to send the response cell to a path identified by the input path identification information. Thus, the path merging type communication apparatus can identify a pre-merged path and send a response to an upstream unit that has sent a control cell as one-to-one communication.

An eighteenth aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add an intra-apparatus header containing the input path identification information and the leaf IF unit number to the input ATM cell, to generate an output ATM cell, and to send the output ATM cell to the root IF unit with the root IF unit number obtained from the path designation header conversion table, causing the root IF unit to detect an output ATM cell that contains a control cell to be sent to the controlling unit from output ATM cells that are received from the converting unit, to send the detected output ATM cell to the controlling unit, to remove the intra-apparatus header from the output ATM cell received from the converting unit, and to send the resultant ATM cell to a path in which the ATM cell is merged, and causing the controlling unit to perform a process corresponding to information of the control cell in the output ATM cell received from the root IF unit, to generate a response cell that contains the input path identification information and information of the process result corresponding to the input path identification information and the leaf IF unit number contained in the intra-apparatus header of the control cell, and to send the response cell to a leaf IF unit having the leaf IF unit number so as to send the response cell to a path identified by the input path identification information. Thus, the path merging type communication apparatus can identify a pre-merged path and send a response to an upstream unit that has sent a control cell as one-to-one communication.

A nineteenth aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the leaf IF unit to extract input path identification information and a leaf IF unit number for identifying a leaf IF unit from which an input ATM cell is received from the input ATM cell, to add an intra-apparatus header containing the input path identification information and the leaf IF unit number to the input ATM cell, to generate an intra-apparatus ATM cell, and to send the intra-apparatus ATM cell to the converting unit, causing the converting unit to extract the input path identification information and the leaf IF unit number from an intra-apparatus header of the input intra-apparatus ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the intra-apparatus ATM cell to output path identification information obtained from the path designation header conversion table, to convert the intra-apparatus ATM cell into an output ATM cell, and to send the output ATM cell to the root IF unit having a root IF unit number obtained from the path designation header conversion table, causing the root IF unit to detect an output ATM cell that contains a control cell to be sent to the controlling unit from output ATM cells that are received from the converting unit, to send the detected output ATM cell to the controlling unit, to remove the intra-apparatus header from the output ATM cell received from the converting unit, and to send the resultant ATM cell to a path in which the ATM cell is merged, and causing the controlling unit to perform a process corresponding to information of the control cell in the output ATM cell received from the root IF unit, to generate a response cell that contains the input path identification information and information of the process result corresponding to the input path identification information and the leaf IF unit number contained in the intra-apparatus header of the control cell, and to send the response cell to a leaf IF unit having the leaf IF unit number so as to send the response cell to a path identified by the input path identification information. Thus, since the leaf IF unit can perform the intra-apparatus header adding process, the structure of the converting unit of the path merging type communication apparatus can be simplified.

A twentieth aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the leaf IF unit to extract input path identification information and a leaf IF unit number for identifying a leaf IF unit from which the input ATM cell is received from the input ATM cell, to convert the extracted input path identification information and leaf IF unit number into an intra-apparatus ID, to rewrite the input path identification information contained in a path information storing area of the input ATM cell to the intra-apparatus ID obtained from the intra-apparatus ID conversion table, to add an intra-apparatus header containing the extracted input path identification information and leaf IF unit number to the input ATM cell, to generate an intra-apparatus ATM cell, and to send the intra-apparatus ATM cell to the converting unit, causing the converting unit to extract input path identification information, the leaf IF unit number, and the intra-apparatus ID from the input intra-apparatus ATM cell, to convert the extracted intra-apparatus ID into output path identification information for identifying an output designation of an output ATM cell and a root IF unit number of the root IF unit to which the output ATM cell is sent, to rewrite the intra-apparatus ID contained in a path information storing area of the intra-apparatus ATM cell to the output path identification information obtained from the path designation header conversion table, to generate an output ATM cell, and to send the output ATM cell to the root IF unit having the root IF unit number obtained from the path designation header conversion table, causing the root IF unit to detect an output ATM cell that contain the intra-apparatus header and contains a control cell to be sent to the controlling unit from output ATM cells that are received from the converting unit, to send the detected output ATM cell to the controlling unit, to remove the intra-apparatus header from the output ATM cell received from the converting unit, and to send the resultant ATM cell to a path in which the ATM cell is merged, and causing the controlling unit to perform a process corresponding to information of the control cell in the output ATM cell received from the root IF unit, to generate a response cell that contains the input path identification information and information of the process result corresponding to the input path identification information and the leaf IF unit number contained in the intra-apparatus header of the control cell, and to send the response cell to a leaf IF unit having the leaf IF unit number so as to send the response cell to a path identified by the input path identification information. Thus, the path merging type communication apparatus can search the content of the path designation header conversion table with the intra-apparatus ID.

A twenty-first aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add a first intra-apparatus header containing the input path identification information and the leaf IF unit number to the input ATM cell, generating an output ATM cell, and to send the output ATM cell to the root IF unit having the root IF unit number obtained from the path designation header conversion table, causing the root IF unit to detect an output ATM cell that contains a control cell to be sent to the controlling unit from output ATM cells that contain the first intra-apparatus header and are received from the converting unit, to send the detected output ATM cell to the controlling unit, to remove the first intra-apparatus header from the output ATM cell received from the converting unit, and to send the resultant ATM cell to a path in which the ATM cell is merged, causing the controlling unit to perform a process corresponding to information of the control cell in the output ATM cell received from the root IF unit, to generate a first response cell that contains information of the process result that is the input path identification information contained in a path information storing area corresponding to the input path identification information and a leaf IF unit number contained in the first intra-apparatus header added to the control cell, to add a second intra-apparatus header that contains the leaf IF unit number and predetermined routing command information to the first response cell, to generate a second response cell, and to send the second response cell to the root IF unit, causing the root IF unit to send the second response cell to the converting unit after receiving the second response cell, and causing the converting unit to send the first response cell to a leaf IF unit identified by the leaf IF unit number corresponding to the predetermined routing command information and a leaf IF unit number contained in the second intra-apparatus header of the second response cell after receiving the second response cell so as to send the response cell to a path identified by the input path identification information. Thus, the path merging type communication apparatus can identify a pre-merged path and send a response to an upstream unit that has sent a control cell as one-to-one communication.

A twenty-second aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add a first intra-apparatus header containing the input path identification information and the leaf IF unit number to the input ATM cell, to generate an output ATM cell, and to send the output ATM cell to the root IF unit having the root IF unit number obtained from the path designation header conversion table, causing the root IF unit to detect an output ATM cell that contains a control cell to be sent to the controlling unit from output ATM cells that contain the first intra-apparatus header and are received from the converting unit and sending the detected output ATM cell to the controlling unit, to remove the intra-apparatus header from the output ATM cell received from the converting unit, and to send the resultant ATM cell to a path in which the ATM cell is merged, causing the controlling unit to perform a process corresponding to information of the control cell in the output ATM cell received from the root IF unit, to generate a first response cell that contains information of the process result that is the input path identification information contained in a path information storing area corresponding to the input path identification information and a leaf IF unit number contained in the first intra-apparatus header added to the control cell, to add a second intra-apparatus header that contains the leaf IF unit number, the input path identification information, and predetermined routing command information to the first response cell, to generate a second response cell, and to send the second response cell to the root IF unit, causing the root IF unit to send the second response cell to the converting unit after receiving the second response cell, causing the converting unit to send the first response cell to a leaf IF unit identified by the leaf IF unit number corresponding to the predetermined routing command information and a leaf IF unit number contained in the second intra-apparatus header of the second response cell after receiving the second response cell, and causing the leaf IF unit to send the second response cell to a path identified by the input path identification information contained in the second intra-apparatus header after receiving the second response cell. Thus, the path merging type communication apparatus can identify a pre-merged path and send a response to an upstream unit that has sent a control cell as one-to-one communication.

A twenty-third aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add an intra-apparatus header containing the input path identification information and the leaf IF unit number to the input ATM cell, to generate an output ATM cell, and to send the output ATM cell to the root IF unit having the root IF unit number obtained from the path designation header conversion table, causing the root IF unit to detect an output ATM cell that contains a control cell from output ATM cells that are received from the converting unit, to send the detected output ATM cell to the control cell rewriting unit, to remove the intra-apparatus header from the output ATM cell received from the converting unit, to send the resultant ATM cell to a path in which the ATM cell is merged, to send only information for controlling the path merging type communication apparatus of the information contained in the control cell to the controlling unit, to store input path identification information and a leaf IF unit number contained in an intra-apparatus header of the control cell, to receive information against the control result from the controlling unit, to generate a first response cell containing the leaf IF unit number, the input path identification information, and information of the process result corresponding to information of the received control result and the input path identification information and the leaf IF unit number contained in the intra-apparatus header, and to send the first response cell to a leaf IF unit identified by the leaf IF unit number through the converting unit, causing the controlling unit to perform a process corresponding to the control information received from the control cell rewriting unit and to send the control result to the control cell rewriting unit, and causing the leaf IF unit to send a second response cell of which the leaf IF unit number is removed from the first response cell to a path identified by the input path identification information. Thus, the path merging type communication apparatus can identify a pre-merged path and send a response to an upstream unit that has sent a control cell as one-to-one communication.

A twenty-fourth aspect of the present invention is a path merging type communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add an intra-apparatus header containing the input path identification information and the leaf IF unit number to the input ATM cell, to generate an output ATM cell, and to send the output ATM cell to the root IF unit having the root IF unit number obtained from the path designation header conversion table, causing the root IF unit to detect an output ATM cell that contains a control cell from output ATM cells that are received from the converting unit, to send the detected output ATM cell to the control cell rewriting unit, to remove the intra-apparatus header from the output ATM cell received from the converting unit, to send the resultant ATM cell to a path in which the ATM cell is merged, to sending only information for controlling the path merging type communication apparatus of the information contained in the control cell, to send input path identification information and a leaf IF unit number contained in an intra-apparatus header of the control cell to the controlling unit, to receive information against the control result from the controlling unit, to generate a first response cell containing the leaf IF unit number, the input path identification information, and information of the process result corresponding to information of the received control result and the input path identification information and the leaf IF unit number contained in the intra-apparatus header, and to send the first response cell to the converting unit, causing the controlling unit to perform a process corresponding to the control information received from the control cell rewriting unit and to send the control result to the control cell rewriting unit, and causing the converting unit to send a second response of which the leaf IF unit number is removed from the first response cell to a leaf IF unit identified by the leaf IF unit number so as to send the response cell to a path identified by the input path identification information. Thus, the path merging type communication apparatus can identify a pre-merged path and send a response to an upstream unit that has sent a control cell as one-to-one communication.

A twenty-fifth aspect of the present invention is a record medium from which the computer reads a program for accomplishing a path merging type communication method used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit to cause the converting unit to perform steps of extracting input path identification information and a leaf IF unit number for identifying a leaf IF unit from which the input ATM cell is received from the input ATM cell, converting the input path identification information and the leaf IF unit number into output path identification information for identifying an output destination of the input ATM cell and a root IF unit number for identifying the root IF unit to which the input ATM cell is sent, and a header processing unit for rewriting the input path identification information contained in a path information storing area of the input ATM cell to the output path identification information obtained from the path designation header conversion table, adding an intra-apparatus header containing the input path identification information and the leaf IF unit number to the input ATM cell, generating an output ATM cell, and sending the output ATM cell to the root IF unit with the root IF unit number obtained from the path designation header conversion table, the root IF unit to perform the steps of detecting an output ATM cell that contains a control cell to be sent to the controlling unit from output ATM cells that are received from the converting unit and sending the detected output ATM cell to the controlling unit, and removing the intra-apparatus header from the output ATM cell received from the converting unit and sending the resultant ATM cell to a path in which the ATM cell is merged, the controlling unit to perform the step of performing a process corresponding to information of the control cell in the output ATM cell received from the root IF unit, generating a response cell that contains the input path identification information and information of the process result corresponding to the input path identification information and the leaf IF unit number contained in the intra-apparatus header of the control cell, sending the response cell to a leaf IF unit having the leaf IF unit number, and the leaf IF unit to perform the step of sending the response cell to a path identified by the input path identification information. Thus, the path merging type communication apparatus can identify a pre-merged path and send a response to an upstream unit that has sent a control cell as one-to-one communication.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 5 is a schematic diagram showing data flows exchanged by the path merging type communication apparatus according to the present invention;

FIG. 6 is a schematic diagram showing the structure of the path merging type communication apparatus according to the present invention and data flows thereof;

FIG. 9 is a flow chart showing an example of a process performed by a controlling unit of the path merging type communication apparatus according to the present invention;

FIG. 11A is a block diagram showing the structures of a leaf IF unit, a converting unit, and a root IF unit of a path merging type communication apparatus according to a first embodiment of the present invention;

FIG. 11B is a schematic diagram showing formats and data transitions of an ATM cell processed by the path merging type communication apparatus shown in FIG. 11A;

FIG. 13 is a block diagram showing the structures of a leaf IF unit, a converting unit, and a root IF unit of a path merging type communication apparatus according to a third embodiment of the present invention;

FIG. 14A is a block diagram showing the structures of a leaf IF unit, a converting unit, and a root IF unit of a path merging type communication apparatus according to a fourth embodiment of the present invention;

FIG. 14B is a schematic diagram showing formats and data transitions of an ATM cell processed by the path merging type communication apparatus shown in FIG. 14A;

FIG. 18 is a block diagram showing the structures of a leaf IF unit, a converting unit, and a root IF unit of a path merging type communication apparatus according to an eighth embodiment of the present invention;

FIG. 21 is a block diagram showing the structures of a leaf IF unit, a converting unit, and a root IF unit of a path merging type communication apparatus according to an eleventh embodiment of the present invention.

DESCRIPTION OF PREFERRED EMBODIMENTS

Figure 4:
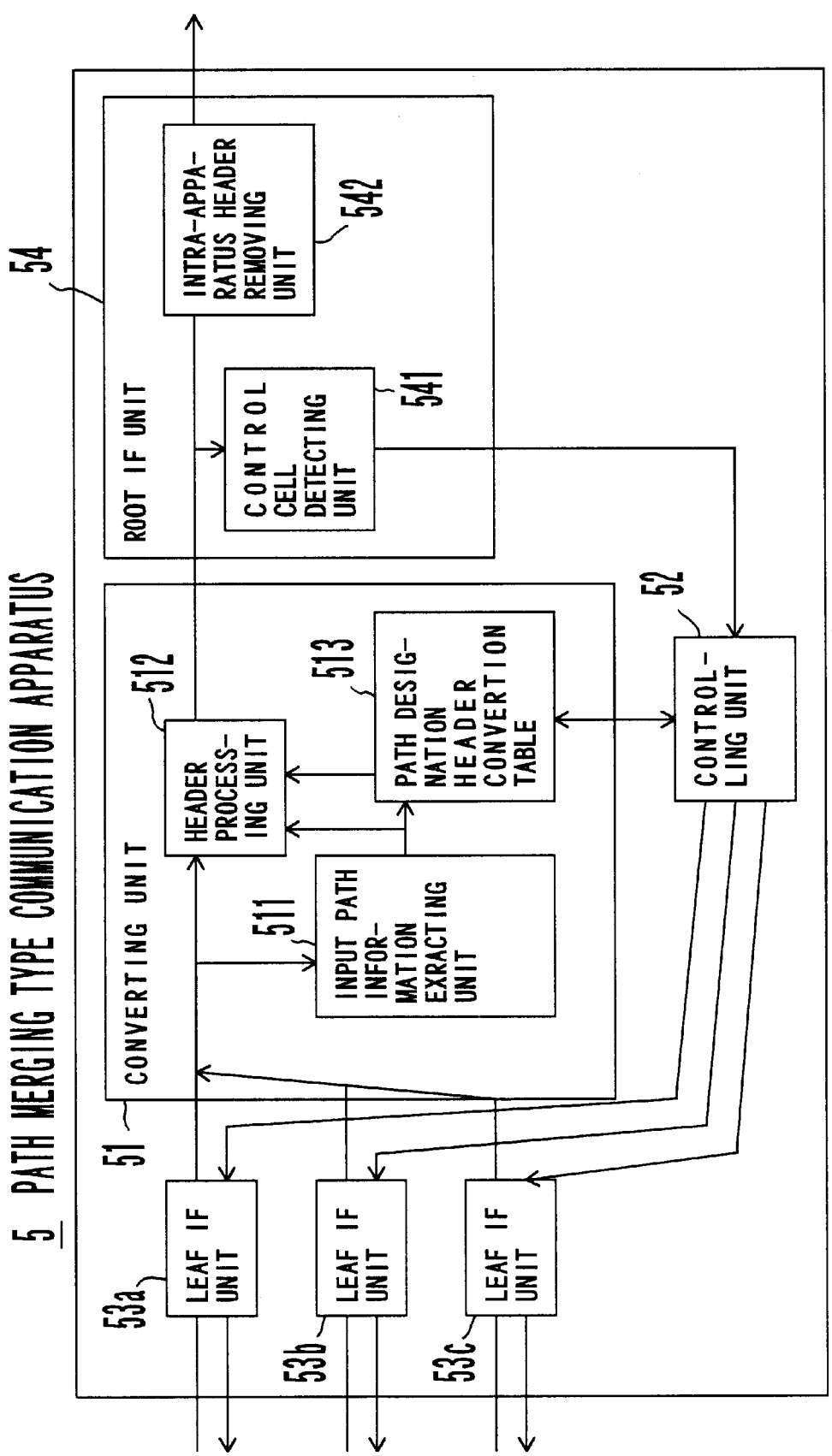
FIG. 4 is a block diagram showing the theory of a path merging type communication apparatus according to the present invention.

FIG. 4 is a block diagram showing the structures of first to third embodiments of the present invention. A path merging type communication apparatus 5 comprises a plurality of leaf IF units (53a, 53b, 53c, . . . , and so forth), a converting unit 51, a controlling unit 52, and a root IF unit 54. The leaf IF units (53a, 53b, 53c, . . . , and so forth) receive ATM cells from respective paths. The converting unit 51 is connected to the leaf IF units (53a, 53b, 53c, . . . and so forth). The converting unit 51 receives ATM cells from different paths, designates one path, merges the received ATM cells, and sends the merged ATM cells to the designated path. The controlling unit 52 is connected to the converting unit 51. The controlling unit 52 controls the leaf IF units (53a, 53b, 53c, . . . , and so forth), the converting unit 51, and the root IF unit 54. The root IF unit 54 sends the merged ATM cells to the path designated by the converting unit 51. The converting unit 51 comprises an input path information extracting unit 511, a path designation header conversion table 513, and a header processing unit 512. The input path information extracting unit 511 extracts input path identification information and a leaf IF unit number from each ATM cell. The input path identification information is contained in an input ATM cell. The leaf IF unit number is used to identify the leaf IF units (53a, 53b, 53c, . . . , and so forth) that have received the input ATM cells. The path designation header conversion table 513 is used to convert the input path identification information and the leaf IF unit number into output path identification information and a root IF unit number. The output path identification information is used to identify the output destination of the ATM cell. The root IF unit number is used to identify the root IF unit 54 to which the ATM cell is output. The header processing unit 512 rewrites the input path identification information contained in a path information storing area of the input ATM cell to the output path identification information obtained from the path designation header conversion table. In addition, the header processing unit 512 adds an intra-apparatus header containing the input path identification information and the leaf IF unit number to the input ATM cell, generates an output ATM cell, and sends the output ATM cell to the root IF unit 54 with the root IF unit number obtained from the path designation header conversion table 513. The root IF unit 54 comprises a control cell detecting unit 541 and an intra-apparatus header removing unit 542. The control cell detecting unit 541 detects the output ATM cell with the control cell to be sent to the controlling unit from the output ATM cells containing intra-apparatus unit headers received from the converting unit 51 and sends the detected output ATM cell to the controlling unit 52. The intra-apparatus header removing unit 542 removes the intra-apparatus header from the output ATM cell received from the converting unit 51 and sends the resultant ATM cell to the designated path. The controlling unit 52 performs a process corresponding to information of the control cell in the output ATM cell received from the root IF unit 54, generates a response cell containing the input path identification information and the processed result corresponding to the input path identification information and the leaf IF unit number in the intra-apparatus header added to the control cell, and sends the response cell to the leaf IF unit (53a, 53b, 53c, . . . etc) having the leaf IF unit number. Thus, the response cell is sent to a path identified by the input path identification information.

The present invention is a modification of a function of the ATM communication unit 8 that provides a merging and connecting operation (N-to-one merging type communication) (where N is any integer larger than 2).

Figure 1:
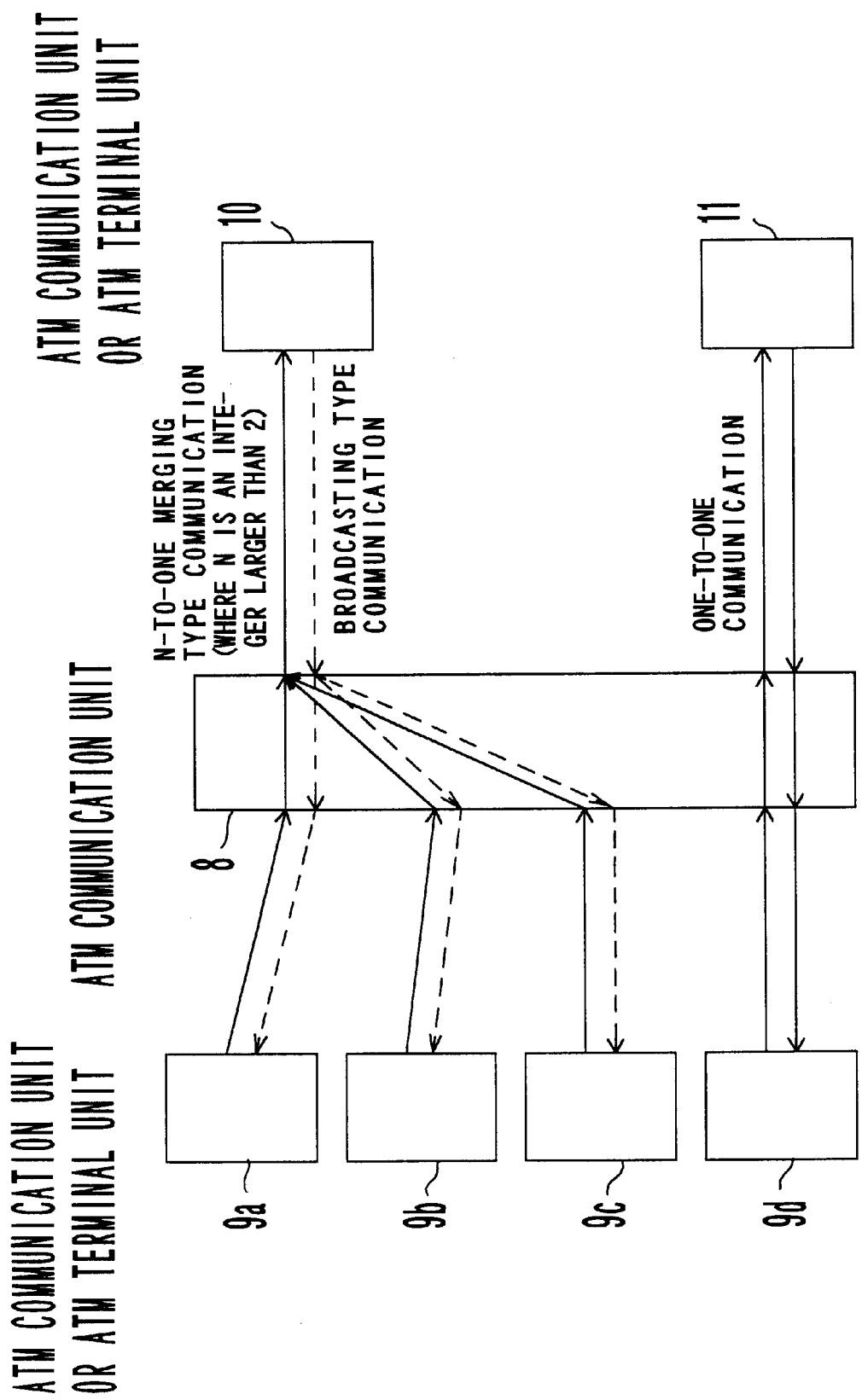
FIG. 1 is a schematic diagram showing an example of the structure of a network having a conventional ATM communication unit.
Figure 2:
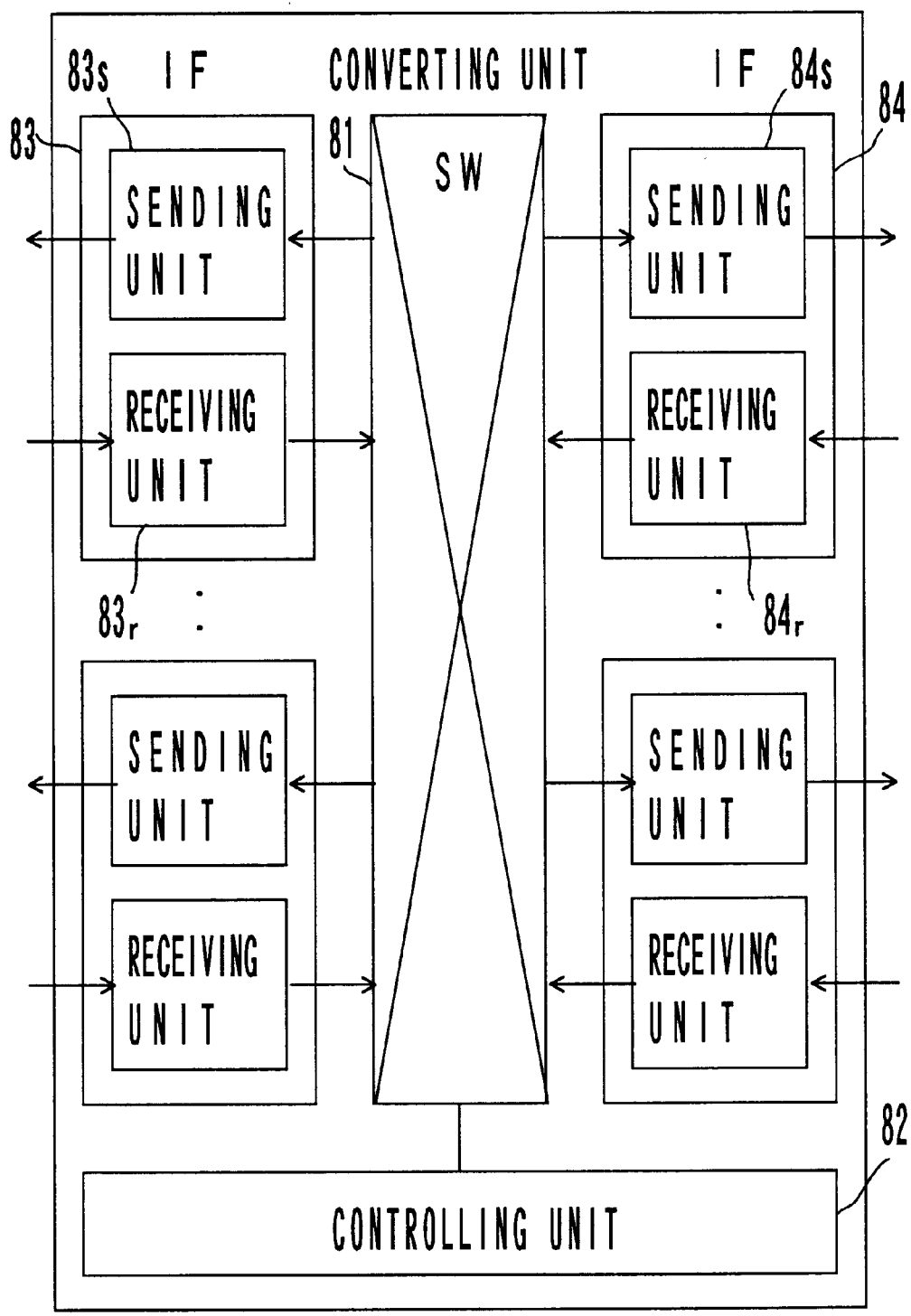
FIG. 2 is a block diagram showing an example of the structure of a conventional ATM communication unit.
Figure 3:
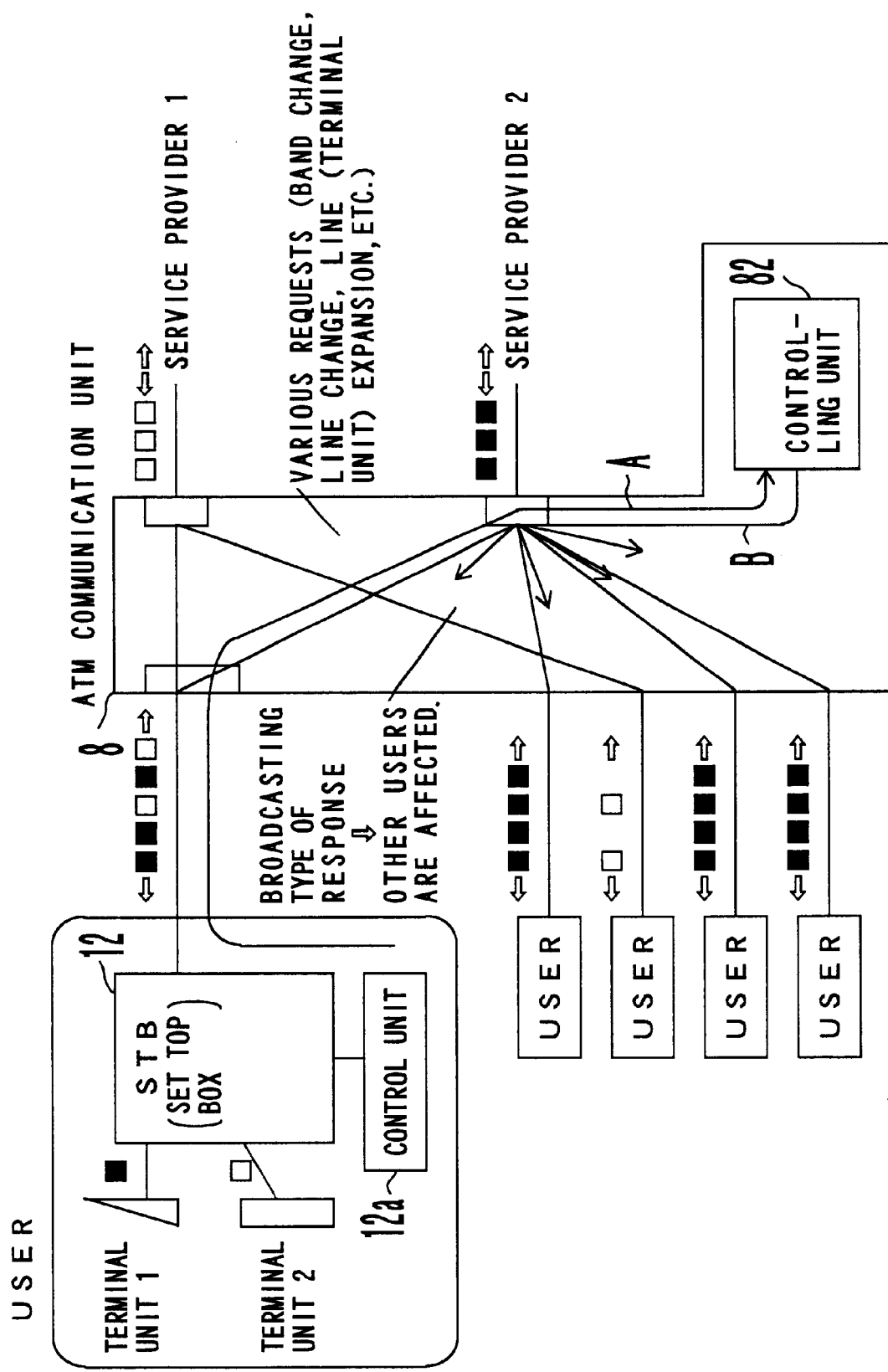
FIG. 3 is a schematic diagram showing data flows exchanged by the conventional ATM communication unit.

FIG. 5 is a schematic diagram showing data flows switched by the path merging type communication apparatus 5. One of a plurality of users who use a service provider 2 (for example, a user who uses a terminal unit 1 through a set top box (STB) 6) communicates with the service provider 2 through the path merging type communication apparatus 5 (data blocks of this communication are represented by black squares). Data is sent from the terminal unit 1 to the service provider 2. Various requests to the path merging type communication apparatus 5 are sent from the controlling unit 6a of the set top box 6 to the controlling unit 52 of the path merging type communication apparatus 5. Responses against the requests are sent to only the set top box 6 of the terminal unit 1 that has sent the requests. On the other hand, in the communication using the conventional ATM communication unit 8 shown in FIG. 3, the responses are sent to all set top boxes 12 of the users with connections to the ATM communication unit 8.

Figure 7:
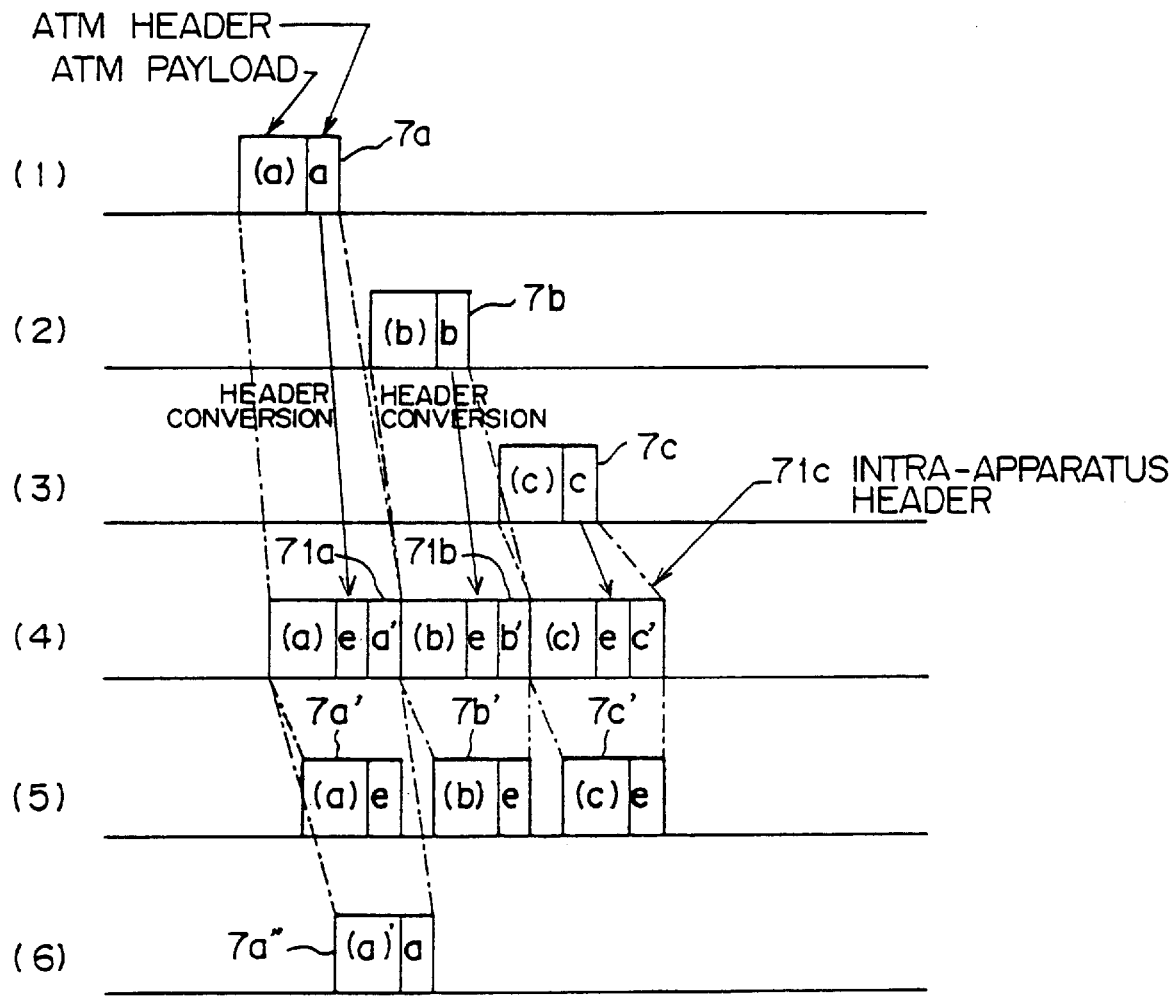
FIG. 7 is a schematic diagram showing a converting operation and a switching operation of an ATM cell format of the path merging type communication apparatus according to the present invention.

FIG. 6 shows the structure of the above-described path merging type communication apparatus 5 and data flows thereof. FIG. 7 shows a format converting operation and a data merging operation of ATM cells performed by the path merging type communication apparatus 5. FIGS. 8A to 8D show various formats of ATM cells used in the path merging type communication apparatus 5. In FIG. 6, for simplicity, only a set of paths (a, b, and c) merged to one path e is described. However, it should be noted that a plurality of merging sets can be designated in the apparatus.

Figure 8:
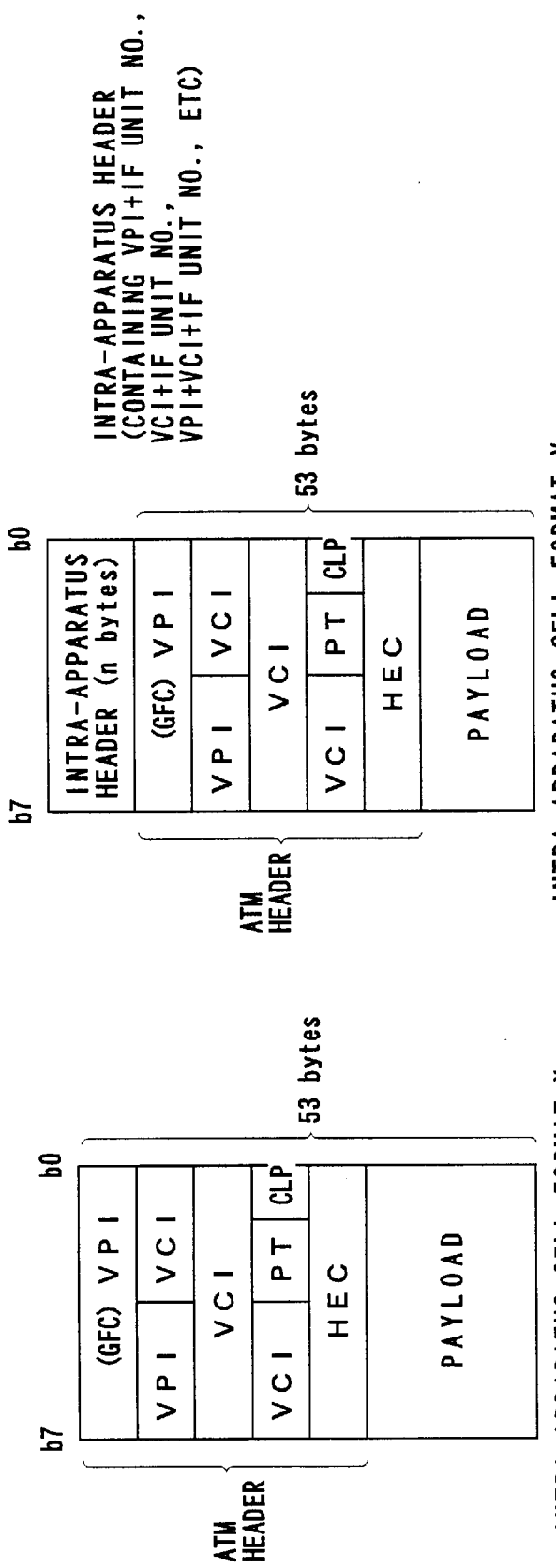
FIGS. 8A to 8D are schematic diagrams showing examples of ATM cell formats and headers used in the path merging type communication apparatus according to the present invention.

Next, with reference to FIG. 6, a case that paths a, b, and c are merged from leaf IF units 53 (53a, 53b, and 53c) connected to the paths a, b, and c with VPI=VPIa, VPIb, and VPIc to a root IF unit 54 connected to a path e with VPI=VPIe will be considered. Actually, VPI=VPIa, VPIb, and VPIc and destination VPI=VPIe and an IF unit number of the root IF unit 54 corresponding to the IF unit numbers of the leaf IF units 53 (53a, 53b, and 53c) are contained in a path designation header conversion table (not shown). With the conversion table, the converting unit 51 performs a converting process for merging the above-described paths. A controlling unit 52 is connected the converting unit 51. The controlling unit 52 controls a rewriting process for the path designation header conversion table when a connection is established or released. An ATM cell with VPI=VPIa received from the leaf IF unit 53a (the ATM cell has an inter-apparatus cell format x as shown in FIG. 8A) is converted into an ATM cell with VPI=VPIe at a position (d) downstream of the converting unit 51) (at the position (d), the ATM cell has an intra-apparatus cell format y as shown in FIG. 8B). Information of VPIa in the VPI area of the ATM cell in the format x in the leaf IF unit 53a is placed in the intra-apparatus header of the ATM cell in the intra-apparatus cell format y. FIG. 8C shows an example of the format of the intra-apparatus header. The intra-apparatus header contains the IF unit number of the leaf IF unit 53 to which the ATM cell is input and the values of VPI and VCI in the header of the input ATM cell. FIG. 8D shows a format of another intra-apparatus header. This intra-apparatus header is composed of the format shown in FIG. 8C and an R flag used in a tenth embodiment of the present invention (that will be described later).

FIG. 7 shows an example of such a process. In the order of steps (1) to (6) in FIG. 7, the process will be described. At steps (1), (2), and (3), input ATM cells 7a, 7b, and 7c (each of which is composed of an ATM header and an ATM payload) of the leaf IF units 53a, 53b, and 53c are stored in a buffer (not shown) of the path merging type communication apparatus 5. The VPI areas of the ATM headers a, b, and c of the ATM cells 7a, 7b, and 7c contain VPIa, VPIb, and VPIc, respectively. The ATM payloads of the ATM cells 7a, 7b, and 7c contain information (a), (b), and (c), respectively. For simplicity, in FIG. 7, as the content of each ATM header, only the last one character of the VPI is represented. At step (4), the converting unit 51 merges the ATM cells 7a, 7b, and 7c received from the leaf IF units 53 (53a, 53b, and 53c). At this point, the above-described cell format y is used. Unlike with the conventional ATM communication unit 8, VPIa, VPIb, and VPIc in the VPI areas of the ATM headers are contained in the intra-apparatus headers 71 (71a, 71b, and 71c). According to an embodiment of the present invention, the VPIe obtained from the path designation header conversion table is contained in an ATM cell denoted by e.

At step (5), ATM cells 7a', 7b', and 7c' in the cell format x of which the intra-apparatus headers 71a, 71b, and 71c are removed from the ATM cells merged at step (4) are generated. This process is performed in the root IF unit 54. The root IF unit 54 drops (selects) an objective cell (for example, a control cell with a particular VCI value or a control cell for requesting the increase of a band width) and sends the dropped cell to the controlling unit 52. The controlling unit 52 identifies a pre-merged connection with connection information (a leaf IF unit number, a VPI, and a VCI) contained in the intra-apparatus header 71 of the dropped cell and performs a messaging process with an upstream unit corresponding to the identified connection. When necessary, the identified leaf IF unit 53 sends an ATM cell containing response information to the upstream unit. Thus, a one-to-one bidirectional communication with the upstream unit connected to a pre-merged path is accomplished at step (6) in FIG. 7. In this case, the objective cell is a cell with an ATM header a' at step (4) in FIG. 7. An ATM cell containing response information is a cell 7a" with an ATM header a at step (6) in FIG. 7.

FIG. 9 is a flow chart showing a band change process performed by the controlling unit 52. As described above, when a control cell for requesting a service to the path merging type communication apparatus 5 is received from the root IF unit 54 (at step S1), it is determined whether or not the cell is a band change request cell (at step S2). When the determined result at step S2 is No, the cell is discarded (at step S3). Thus, the process is completed. In this example, since the path merging type communication apparatus 5 deals with only a service for the band change request, the cell is discarded. Actually, other control cells for requesting path merging type communication apparatus 5 to perform services other than the band change request are processed corresponding to respective processes (not shown). When the determined result at step S2 is Yes, the flow advances to step S4. At step S4, it is determined whether or not the band of the path corresponding to the leaf IF unit number and the VPI in the intra-apparatus header of the control cell can be changed as requested (at steps S4 and S5). Corresponding to the determined result at step S5, a respective response message is generated (at steps S6 and S7). Next, a response cell is generated in the format x. The VPI in the intra-apparatus header is placed in the VPI area of the ATM header of the response cell (at step S8). The process at step S8 is equivalent to the process for generating the response cell 7a" whose VPI area of the ATM header contains VPIa and whose ATM payload contains response information (a)' at step (6) in FIG. 7. Thereafter, the leaf IF unit 53 represented by the IF unit number in the intra-apparatus header sends the response cell generated at step S8 (at step S9).

Figure 10A:
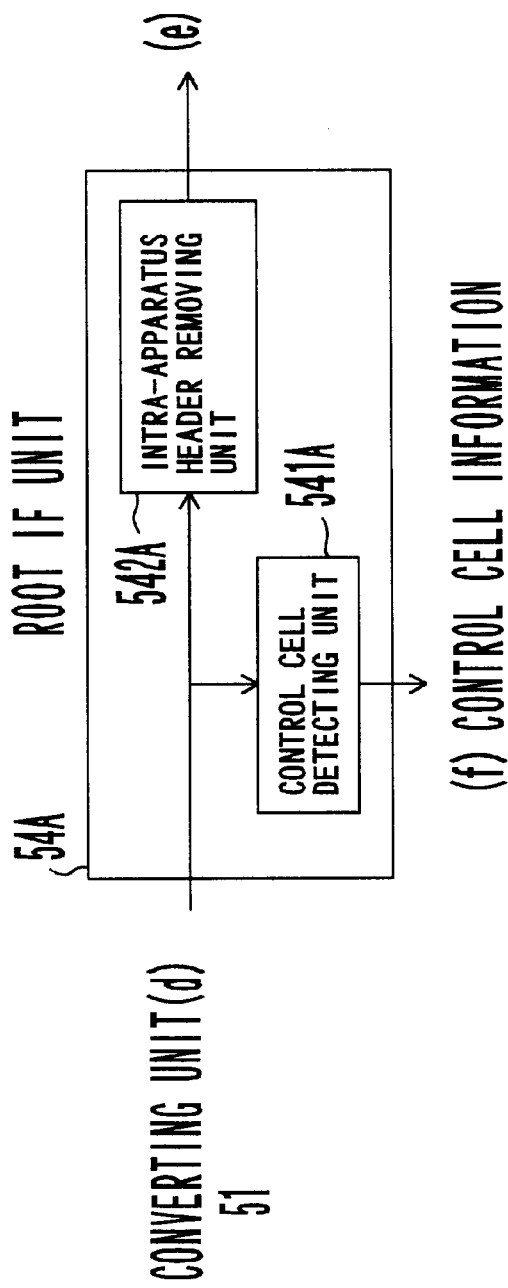
FIG. 10A is a block diagram showing the structure of a root IF unit of the path merging type communication apparatus according to the present invention.
Figure 10B:
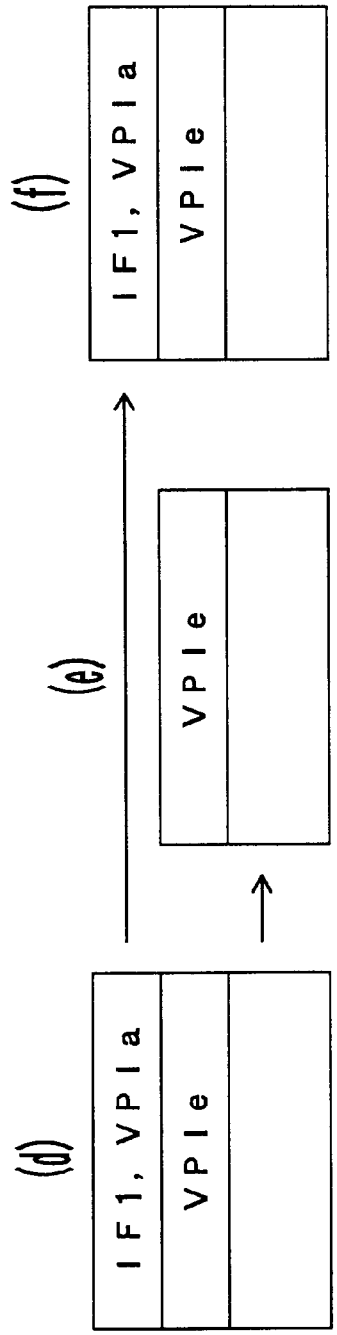
FIG. 10B is a schematic diagram showing formats and data transitions of an ATM cell processed by the root IF unit of the path merging type communication apparatus shown in FIG. 10A.

FIG. 10A shows an example of the structure of the root IF unit 54. FIG. 10B shows formats of an ATM cell corresponding to positions denoted by (d), (e), and (f) in the structure shown in FIG. 10A. (d), (e), and (f) also represent formats and contents of data of the ATM cell at these positions. With reference to FIGS. 10A and 10B, the structure of the root IF unit 54 will be described. A root IF unit 54A comprises an intra-apparatus header removing unit 542A and a control cell detecting unit 541A. The intra-apparatus header removing unit 542A removes an intra-apparatus header from a cell received from the converting unit 51. The control cell detecting unit 541A detects a cell for controlling the ATM system (control cell) and sends the cell to the controlling unit 52. As described above, a cell (d) received from the converting unit 51 contains VPI=VPIe in the conventional ATM header. In addition, the cell (d) contains a leaf IF unit identification number IF1 and VPI= VPIa in the intra-apparatus header (cell format y). A cell (f) that is sent from the control cell detecting unit 541A has the same format and content as those of the cell (d) as shown in FIG. 10B. A cell (e) that is sent from the root IF unit 54 (namely, the intra-apparatus header removing unit 542A) has the conventional format (namely, the cell format x) for compatibility with the conventional system. Thus, the cell (e) does not contain input connection information (IF1 and VPI=VPIa).

Next, with reference to the accompanying drawings, embodiments of the present invention will be described. For simplicity, similar reference numerals are denoted by similar reference numerals and their description will be omitted.

FIGS. 11A and 11B show a first embodiment of the present invention. FIG. 11A shows a leaf (input) IF unit 53A, a converting unit 51A, and a root (output) IF unit 54A of the path merging type communication apparatus 5 according to the first embodiment of the present invention. FIG. 11B shows formats and contents of an ATM cell at positions denoted by (a), (b), (c), and (d) shown in FIG. 11A.

An ATM cell received from an upstream unit of a relevant path is input in the inter-apparatus cell format x (as denoted by (a) in FIGS. 11A and 11B) from a leaf IF unit 53A to a converting unit 51A. A VPI number extracting and leaf IF unit number adding unit 511A of the converting unit 51A extracts an input VPI number (VPIa) of the ATM header of the cell, adds a leaf IF unit number (IF1) of the leaf IF unit 53A to the VPI number (VPIa), and outputs the resultant information to a header processing unit 512A and a path designation header conversion table 513A (as denoted by (b) in FIGS. 11A and 11B). In the case that the leaf IF unit 53A is connected to the converting unit 51A with a connection line, the VPI number extracting and leaf IF unit number adding unit 511A extracts the leaf IF unit number (IF1) by identifying a connection line. In the case that the leaf IF unit 53a is connected to the converting unit 51A with a multiplexed-interface board, the VPI number extracting and leaf IF unit number adding unit 511A extracts the leaf IF unit number (IF1) by identifying the order of the multiplexed time slot. Such leaf IF unit number extracting methods are only examples. With various methods, a leaf IF unit number can be obtained. Such leaf IF unit number extracting methods can be applied to other embodiments of the present invention.

Next, with the input source information (IF1 and VPIa), output destination information (root IF unit number (IF2) and output VPI number (VPIe)) is obtained using the path designation header conversion table 513A (as denoted by (c) in FIGS. 11A and 11B).

A cell that has been processed in the header processing unit 512A and sent from the converting unit 51A has an intra-apparatus cell format y with an intra-apparatus header. The header processing unit 512A places an output VPI number (VPIe) received from the path designation header conversion table 513A to the VPI area of the ATM header. In addition, the header processing unit 512A copies information of the other input ATM cells received from the path designation header conversion table 513A to an area corresponding to an output ATM cell. The header processing unit 512A places a VPI number (VPIa) in the ATM header of the cell received from the VPI number extracting and leaf IF unit number adding unit 511A and the leaf IF unit number (IF1) of the leaf IF unit 53A to the intra-apparatus header and generates a cell in the intra-apparatus cell format y. Thereafter, the header processing unit 512A sends the generated cell to the root IF unit 54A (IF2) corresponding to the root IF unit number (IF2) obtained from the path designation header conversion table 513A (as denoted by (d) in FIGS. 11A and 11B).

In the path merging type communication apparatus 5 according to the first embodiment, since a control ATM cell merged by the converting unit 51A and sent to the controlling unit 52A by the root IF unit 54A contains input path information (the input VPI number (VPIa) and the leaf IF unit number (IF1) of the leaf IF unit 53a), the controlling unit 52A can identify each pre-merged path (virtual path) from which the control cell has been received. Thus, a response cell to a request such as a band change request can be sent back to an upstream unit of a pre-merged path from which the request has been received as one-to-one communication.

Figure 12:
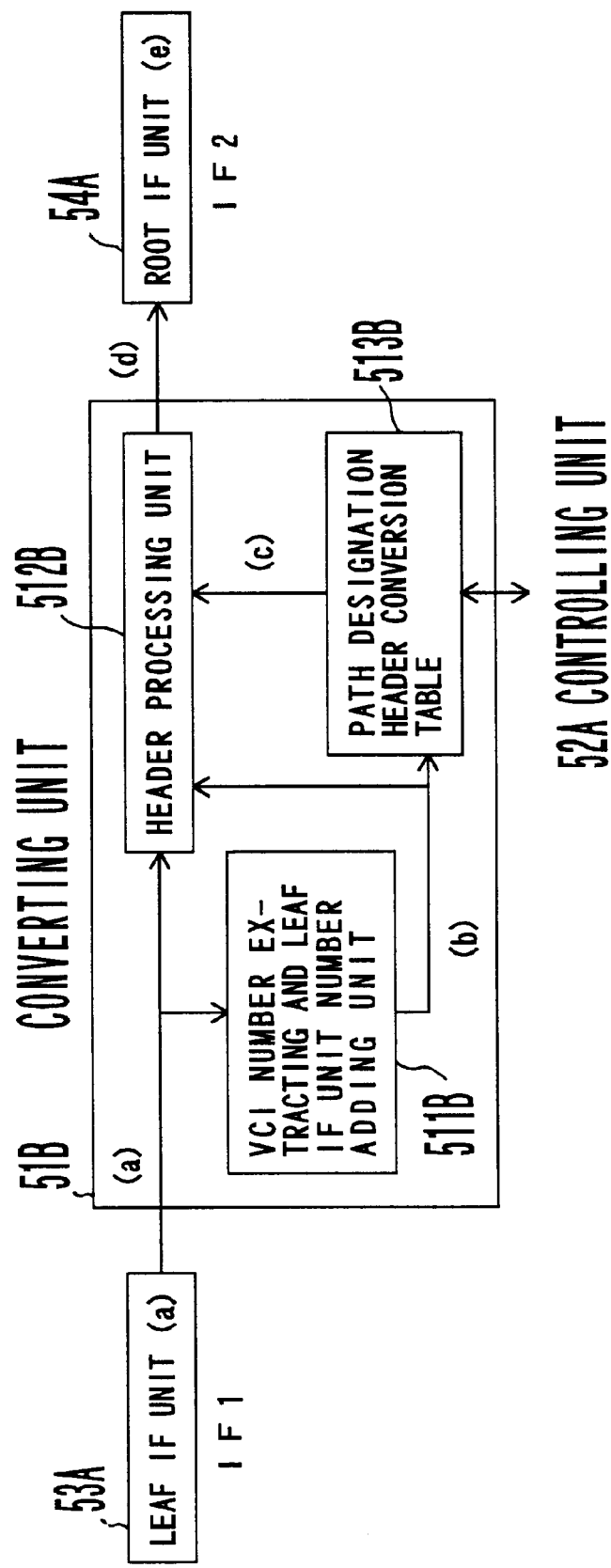
FIG. 12 is a block diagram showing the structures of a leaf IF unit, a converting unit, and a root IF unit of a path merging type communication apparatus according to a second embodiment of the present invention.

In a second embodiment of the present invention, unlike with the first embodiment, a VCI instead of a VPI is used to identify a pre-merged path. FIG. 12 shows a leaf (input) IF unit 53A, a converting unit 51B, and a root (output) IF unit 54A of the path merging type communication apparatus 5 according to the second embodiment of the present invention. Although FIG. 11B shows formats and contents of an ATM cell corresponding to the first embodiment, when VPI numbers VPIa and VPIe are substituted with an input VCI number in the ATM header of an input ATM cell and an output VCI number obtained with the path designation header conversion table 513B, the formats and contents of an ATM cell at positions denoted by (a), (b), (c), and (d) shown in FIG. 11B can be applied for the second embodiment shown in FIG. 12.

An ATM cell received from an upstream unit of a relevant path is input in the inter-apparatus cell format x (as denoted by (a) in FIG. 12) from a leaf IF unit 53A to a converting unit 51B. A VCI number extracting and leaf IF unit number adding unit 511B of the converting unit 51B extracts an input VCI number of the ATM header of the cell, adds a leaf IF unit number (IF1) of the leaf IF unit 53A to the input VCI number, and outputs the resultant information to a header processing unit 512B and a path designation header conversion table 513B (as denoted by (b) in FIG. 12). Next, with the input source information (IF1 and input VCI number), output destination information (root IF unit number (IF2) and output VCI number) is obtained using the path designation header conversion table 513B and sent to the header processing unit 512B (as denoted by (c) in FIG. 12).

A cell that has been processed in the header processing unit 512B and sent from the converting unit 51B has an intra-apparatus cell format y with an intra-apparatus header. The header processing unit 512B places an output VCI number received from the path designation header conversion table 513B to the VCI area of the ATM header. In addition, the header processing unit 512B copies information of the other input ATM cells received from the leaf IF unit 53A to an area corresponding to an output ATM cell. The header processing unit 512B places a VCI number in the ATM header of the cell received from the VCI number extracting and leaf IF unit number adding unit 511B and the leaf IF unit number (IF1) of the leaf IF unit 53A to the intra-apparatus header and generates a cell in the intra-apparatus cell format y. Thereafter, the header processing unit 512B sends the generated cell to the root IF unit 54A (IF2) corresponding to the root IF unit number (IF2) obtained from the path designation header conversion table 513B (as denoted by (d) in FIG. 12).

In the path merging type communication apparatus 5 according to the second embodiment, since a control ATM cell merged by the converting unit 51B and sent to the controlling unit 52A by the root IF unit 54A contains input path information (the input VCI number and the leaf IF unit number (IF1) of the leaf IF unit 53A), the controlling unit 52A can identify each pre-merged path from which the control cell has been received for each channel (virtual channel). Thus, a response cell to a request such as a band change request can be sent back to an upstream unit connected to a pre-merged path with the virtual channel from which the request has been received as one-to-one communication.

As with the first embodiment, the path merging type communication apparatus 5 that switches an ATM cell for each path (virtual path) is used in an environment that each channel (virtual channel) is dedicated to each application. As with the second embodiment, the path merging type communication apparatus 5 that switches an ATM cell for each channel (virtual channel) is used in an environment that each path (virtual path) is dedicated to each user.

In a third embodiment of the present invention, unlike with the first and second embodiments, a VPI and a VCI are used to identify a pre-merged path. FIG. 13 shows a leaf (input) IF unit 53A, a converting unit 51C, and a root (output) IF unit 54A of the path merging type communication apparatus 5 according to the third embodiment of the present invention. Although FIG. 11B shows formats and contents of an ATM cell corresponding to the first embodiment, when an input VCI number in the ATM header of an input ATM cell and an output VCI number obtained with the path designation header conversion table 513C are added to the VPI numbers VPIa and VPIe, the formats and contents of an ATM cell at positions denoted by (a), (b), (c), and (d) shown in FIG. 11B can be applied for the third embodiment shown in FIG. 13.

An ATM cell received from an upstream unit of a relevant path is input in the inter-apparatus cell format x (as denoted by (a) in FIG. 13) from a leaf IF unit 53A to a converting unit 51C. A VPI number/VCI number extracting and leaf IF unit number adding unit 511C of the converting unit 51C extracts an input VPI number (VPIa) and an input VCI number of the ATM header of the cell, adds a leaf IF unit number (IF1) of the leaf IF unit 53A to the input VPI number (VPIa) and the input VCI number, and outputs the resultant information to a header processing unit 512C and a path designation header conversion table 513C (as denoted by (b) in FIG. 13). Next, with the input source information (IF1, VPIa, and input VCI number), output destination information (root IF unit number (IF2), output VPI number (VPIe), and output VCI number) is obtained using the path designation header conversion table 513C and sent to the header processing unit 512C (as denoted by (c) in FIG. 13).

A cell that has been processed in the header processing unit 512C and sent from the converting unit 51C has an intra-apparatus cell format y with an intra-apparatus header. The header processing unit 512C places an output VPI number (VPIe) and an output VCI number received from the path designation header conversion table 513C to the VPI area and the VCI area of the ATM header. In addition, the header processing unit 512C copies information of the other input ATM cells received from the leaf IF unit 53A to an area corresponding to an output ATM cell. The header processing unit 512B places an input VPI number (VPIa) and a VCI number in the ATM header of the cell received from the VPI number/VCI number extracting and leaf IF unit number adding unit 511C and the leaf IF unit number (IF1) of the leaf IF unit 53A to the intra-apparatus header and generates a cell in the intra-apparatus cell format y. Thereafter, the header processing unit 512C sends the generated cell to the root IF unit 54A (IF2) corresponding to the root IF unit number (IF2) obtained from the path designation header conversion table 513A (as denoted by (d) in FIG. 13).

In the path merging type communication apparatus 5 according to the third embodiment, since a control ATM cell merged by the converting unit 51C and sent to the controlling unit 52A by the root IF unit 54A contains input path information (the input VPI number (VPIa), the input VCI number, and the leaf IF unit number (IF1) of the leaf IF unit 53A), the controlling unit 52A can identify each pre-merged path from which the control cell has been received for each channel (virtual channel) accommodated to the path. Thus, a response cell to a request such as a band change request can be sent back to an upstream unit connected to a pre-merged path with the virtual channel from which the request has been received as one-to-one communication.

In fourth to sixth embodiments of the present invention, the leaf IF unit 53 instead of the converting unit 51 (51A, 51B, or 51C) converts the format x of an ATM cell to the format y and places each item of the ATM cell in the format x and a leaf IF unit number in an ATM cell in the format y.

FIG. 14A shows a leaf (input) IF unit 53B, a converting unit 51D, and a root (output) IF unit 54A of a path merging type communication apparatus 5 according to the fourth embodiment of the present invention. FIG. 14B shows formats and contents of an ATM cell at positions denoted by (a), (a1), (a2), (b), (c), and (d) shown in FIG. 14A.

A VPI number extracting and leaf IF unit number adding unit 532B in the leaf IF unit 53B extracts an input VPI number (VPIa) from an ATM cell in an inter-apparatus cell format x (as denoted by (a) in FIGS. 14A and 14B). The VPI number extracting and leaf IF unit number adding unit 532B adds a leaf IF unit number (IF1) of the leaf IF unit 53B to the input VPI number (VPIa) and sends the resultant ATM cell to an intra-apparatus header adding unit 531B (as denoted by (a1) in FIGS. 14A and 14B). The intra-apparatus header adding unit 531B converts the input ATM cell into an intra-apparatus cell format y, places the input VPI number (VPIa) and the leaf IF unit number (IF1) to the intra-apparatus header, copies other ATM cell information from the input ATM cell (as denoted by (a2) in FIG. 14B), and sends the resultant cell in the intra-apparatus cell format y to the converting unit 51D (as denoted by (a2) in FIG. 14A). A leaf IF unit number extracting unit 511D of the converting unit 51D extracts the input VPI number (VPIa) and the leaf IF unit number (IF1) from the intra-apparatus header of the cell in the intra-apparatus cell format y and sends the input VPI number (VPIa) and the leaf IF unit number (IF1) to a path designation header conversion table 513D (as denoted by (b) in FIG. 14A). A header processing unit 512D obtains output destination information (output VPI number (VPIe) and root IF unit number (IF2)) from the path designation header conversion table 513D (as denoted by (c) in FIG. 14B). The header processing unit 512D places the output VPI number (VPIe) obtained from the path designation header conversion table 513D to the VPI area of the ATM header, copies other information including the intra-apparatus header from the input information received from the leaf IF unit 53B and the VPI number and leaf IF unit number extracting unit 511D, generates a cell in the intra-apparatus cell format y (as denoted by (d) in FIG. 14B), and sends the cell to the root IF unit 54A (IF2) corresponding to the output destination IF unit number (IF2) obtained from the path designation header conversion table 513D (as denoted by (d) in FIG. 14A).

In the path merging type communication apparatus 5 according to the fourth embodiment, since a control ATM cell merged by the converting unit 51D and sent to the controlling unit 52A by the root IF unit 54A contains input path information (the input VPI number (VPIa) and the leaf IF unit number (IF1) of the leaf IF unit 53B), the controlling unit 52A can identify each pre-merged path (virtual path) from which the control cell has been received. Thus, a response cell to a request such as a band change request can be sent back to an upstream unit of a pre-merged path from which the request has been received as one-to-one communication. In addition, since the leaf IF unit 53B performs the intra-apparatus header adding process, the converting unit 51D only performs a simple header converting function. Thus, the circuit scale can be reduced.

Figure 15:
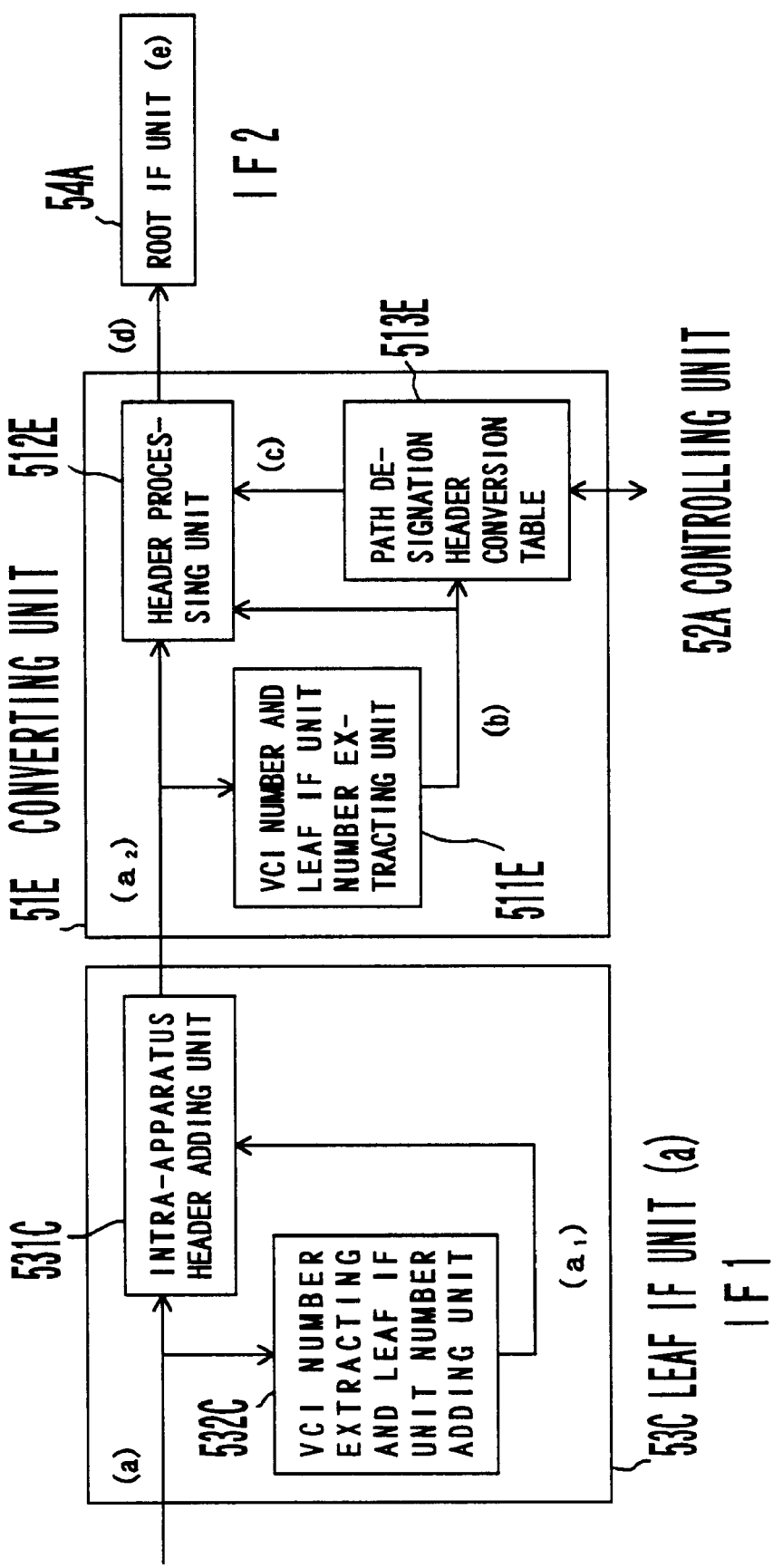
FIG. 15 is a block diagram showing the structures of a leaf IF unit, a converting unit, and a root IF unit of a path merging type communication apparatus according to a fifth embodiment of the present invention.

In a fifth embodiment of the present invention, unlike with the fourth embodiment, a VCI instead of a VPI is used to identify a pre-merged path. FIG. 15 shows a leaf (input) IF unit 53C, a converting unit 51E, and a root (output) IF unit 54A of the path merging type communication apparatus 5 according to the fourth embodiment of the present invention. Although FIG. 14B shows formats and contents of an ATM cell corresponding to the fourth embodiment, when VPI numbers VPIa and VPIe are substituted with an input VCI number in the ATM header of an input ATM cell and an output VCI number obtained with the path designation header conversion table 513E, the formats and contents of an ATM cell at positions denoted by (a), (a1), (a2), (b), (c), and (d) shown in FIG. 14B can be applied for the fifth embodiment shown in FIG. 15.

A VCI number extracting and leaf IF unit number adding unit 532C in the leaf IF unit 53C extracts an input VCI number from an ATM cell in an inter-apparatus cell format x (as denoted by (a) in FIG. 15). The VCI number extracting and leaf IF unit number adding unit 532C adds a leaf IF unit number (IF1) of the leaf IF unit 53C to the input VCI number and sends the resultant ATM cell to an intra-apparatus header adding unit 531C (as denoted by (a1) in FIG. 15). The intra-apparatus header adding unit 531C converts the input ATM cell of the leaf IF unit 53C into an intra-apparatus cell format y, places the input VCI number and the leaf IF unit number (IF1) to the intra-apparatus header, copies other ATM cell information from the input ATM cell, and sends the resultant cell in the intra-apparatus cell format y to the converting unit 51E (as denoted by (a2) in FIG. 15).

A leaf IF unit number extracting unit 511E of the converting unit 51E extracts the input VCI number and the leaf IF unit number (IF1) from the intra-apparatus header of the cell in the intra-apparatus cell format y and sends the input VCI number and the leaf IF unit number (IF1) to a header processing unit 512E and a path designation header conversion table 513E (as denoted by (b) in FIG. 15). The header processing unit 512E obtains output destination information (output VCI number and root IF unit number (IF2)) from the path designation header conversion table 513E (as denoted by (c) in FIG. 15). The header processing unit 512E places the output VCI number obtained from the path designation header conversion table 513E to the VCI area of the ATM header, copies other information including the intra-apparatus header from the input information received from the leaf IF unit 53C and the VCI number and leaf IF unit number extracting unit 511E, generates a cell in the intra-apparatus cell format y, and sends the cell to the root IF unit 54A (IF2) corresponding to the output destination IF unit number (IF2) obtained from the path designation header conversion table 513E (as denoted by (d) in FIG. 15).

In the path merging type communication apparatus 5 according to the fifth embodiment, since a control ATM cell merged by the converting unit 51E and sent to the controlling unit 52A by the root IF unit 54A contains input path information (the input VCI number and the leaf IF unit number (IF1) of the leaf IF unit 53C), the controlling unit 52A can identify each pre-merged path from which the control cell has been received for each channel (virtual channel). Thus, a response cell to a request such as a band change request can be sent back to an upstream unit of a pre-merged path on the virtual channel from which the request has been received as one-to-one communication. In addition, since the leaf IF unit 53C performs the intra-apparatus header adding process, the converting unit 51E only performs a simple header converting function. Thus, the circuit scale can be reduced.

Figure 16:
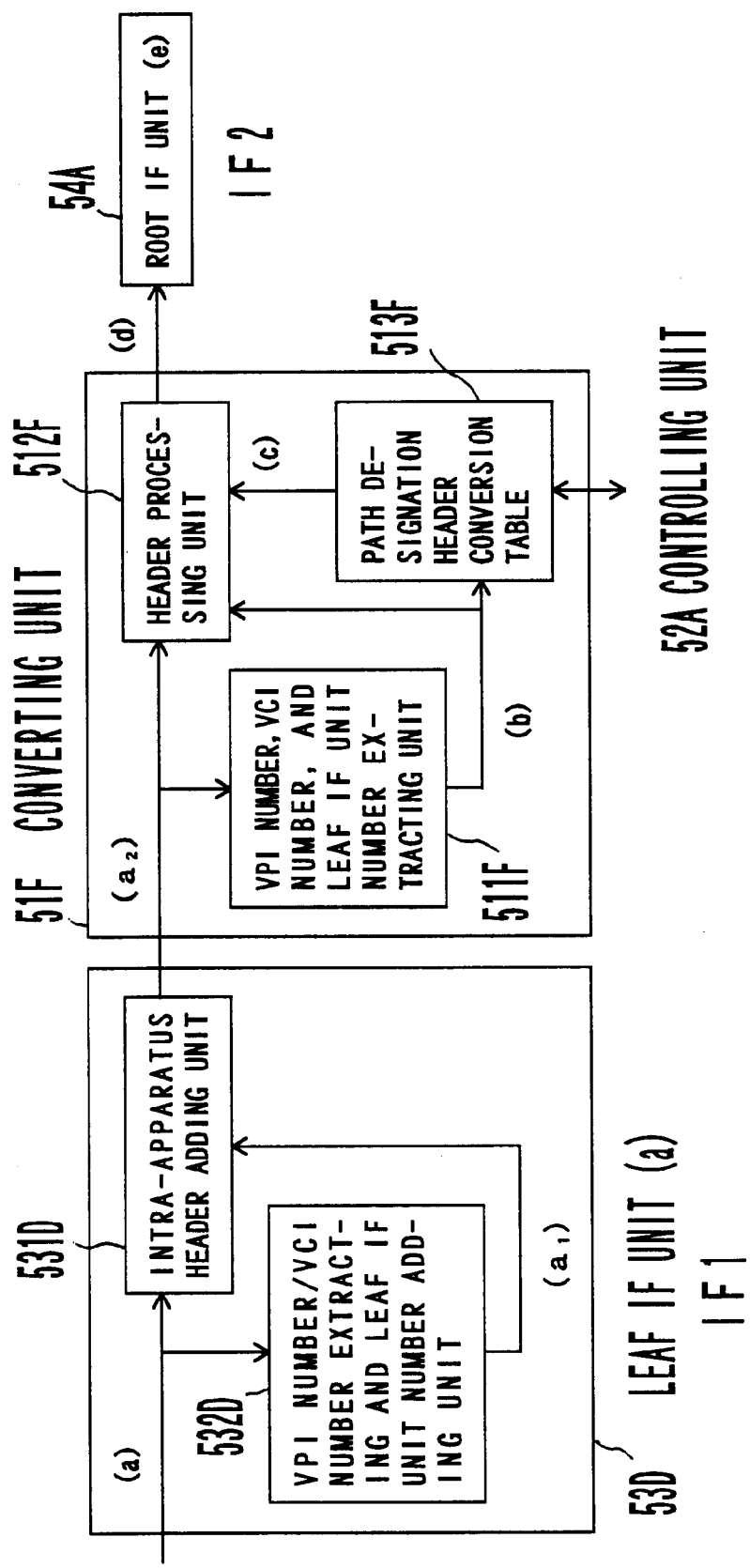
FIG. 16 is a block diagram showing the structures of a leaf IF unit, a converting unit, and a root IF unit of a path merging type communication apparatus according to a sixth embodiment of the present invention.

In a sixth embodiment of the present invention, unlike with the fourth and fifth embodiments, a VPI and a VCI are used to identify a pre-merged path. FIG. 16 shows a leaf (input) IF unit 53D, a converting unit 51F, and a root (output) IF unit 54A of the path merging type communication apparatus 5 according to the sixth embodiment of the present invention. Although FIG. 14B shows formats and contents of an ATM cell corresponding to the fourth embodiment, when an input VCI number in the ATM header of an input ATM cell of the leaf IF unit 53D and an output VCI number obtained from the path designation header conversion table 513F are added to the VPI numbers VPIa and VPIe, the formats and contents of an ATM cell at positions denoted by (a), (a1), (a2), (b), (c), and (d) shown in FIG. 14B can be applied for the sixth embodiment shown in FIG. 16.

A VPI number/VCI number extracting and leaf IF unit number adding unit 532D in the leaf IF unit 53D extracts an input VPI number (VPIa) and an input VCI number from an input ATM cell in an inter-apparatus cell format x of the leaf IF unit 53D (as denoted by (a) in FIG. 16). The VPI number/VCI number extracting and leaf IF unit number adding unit 532D adds a leaf IF unit number (IF1) of the leaf IF unit 53D to the input VPI number (VPIa) and the input VCI number and sends the resultant ATM cell to an intra-apparatus header adding unit 531D (as denoted by (a1) in FIG. 16). The intra-apparatus header adding unit 531D converts the input ATM cell of the leaf IF unit 53D into an intra-apparatus cell format y, places the input VPI number, the input VCI number, and the leaf IF unit number (IF1) to the intra-apparatus header, copies other ATM cell information from the input ATM cell, and sends the resultant cell in the intra-apparatus cell format y to the converting unit 51F (as denoted by (a2) in FIG. 16).

A VPI number, VCI number, and leaf IF unit number extracting unit 511F of the converting unit 51F extracts the input VPI number, the input VCI number, and the leaf IF unit number (IF1) from the intra-apparatus header of the cell in the intra-apparatus cell format y and sends the input VCI number and the leaf IF unit number (IF1) to a header processing unit 512F and a path designation header conversion table 513F (as denoted by (b) in FIG. 16). The header processing unit 512F obtains output destination information (output VPI number (VPIe), output VCI number, and root IF unit number (IF2)) from the path designation header conversion table 513F (as denoted by (c) in FIG. 16). The header processing unit 512F places the output VPI number (VPIe) and the output VCI number obtained from the path designation header conversion table 513F to the VPI area and the VCI area of the ATM header, copies other information including the intra-apparatus header from the input information received from the leaf IF unit 53D and the VPI number, VCI number, and leaf IF unit number extracting unit 511F, generates a cell in the intra-apparatus cell format y, and sends the cell to the root IF unit 54A (IF2) corresponding to the output destination IF unit number (IF2) obtained from the path designation header conversion table 513F (as denoted by (d) in FIG. 16).

In the path merging type communication apparatus 5 according to the sixth embodiment, since a control ATM cell merged by the converting unit 51F and sent to the controlling unit 52A by the root IF unit 54A contains input path information (the input VPI number (VPIa), the input VCI number, and the leaf IF unit number (IF1) of the leaf IF unit 53D), the controlling unit 52A can identify each pre-merged path from which the control cell has been received for each channel (virtual channel) accommodated in the path (virtual path). Thus, a response cell to a request such as a band change request can be sent back to an upstream unit of a pre-merged path on the virtual channel from which the request has been received as one-to-one communication. In addition, since the leaf IF unit 53D performs the intra-apparatus header adding process, the converting unit 51F only performs a simple header converting function. Thus, the circuit scale can be reduced.

In the fourth to sixth embodiments of the present invention, the leaf IF unit 53 (53B, 53C, or 53D) places the input VPI number to the VPI area of the ATM header. Instead, in seventh to ninth embodiments according to the present invention, a leaf IF unit converts an input VPI number into an intra-apparatus ID that is composed of for example 10 bits or less and places the resultant ID to the VPI area of the ATM header. The converting unit 51 designates an output VPI number and a root IF unit number corresponding to the input VPI number and the leaf IF unit number with the intra-apparatus ID.

Figure 17A:
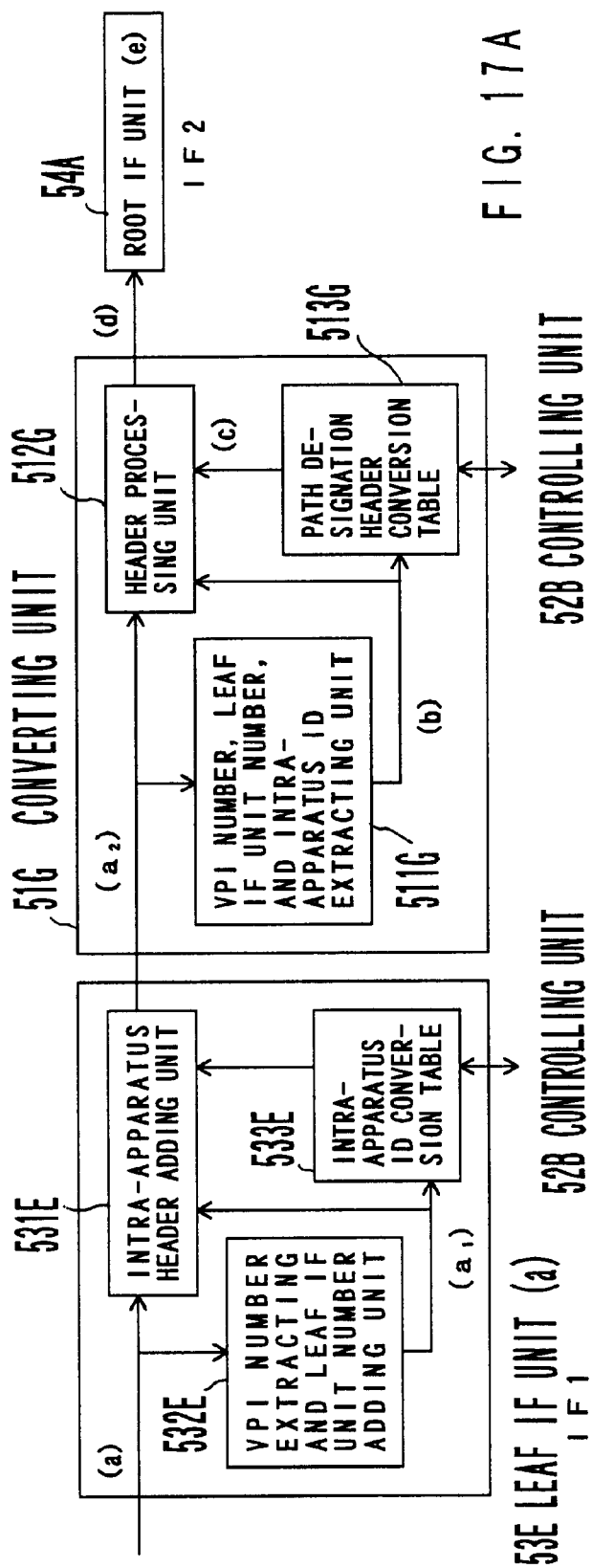
FIG. 17A is a block diagram showing the structures of a leaf IF unit, a converting unit, and a root IF unit of a path merging type communication apparatus according to a sixth embodiment of the present invention.
Figure 17B:
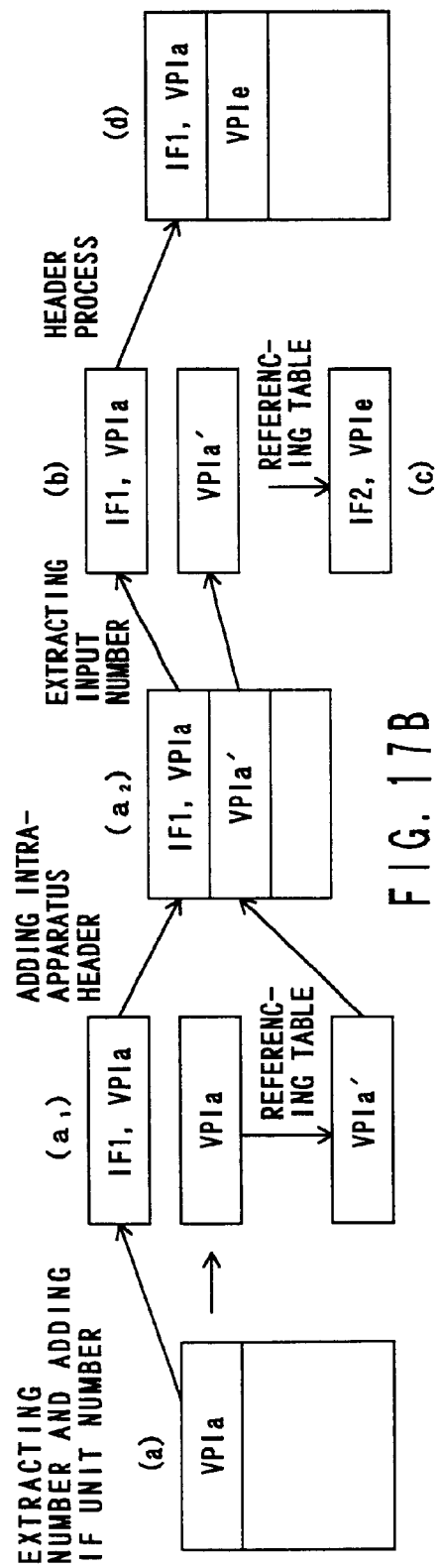
FIG. 17B is a schematic diagram showing formats and data transitions of an ATM cell processed by the path merging type communication apparatus shown in FIG. 17A.

FIG. 17A shows a leaf (input) IF unit 53E, a converting unit 51G, and a root (output) IF unit 54A of a path merging type communication apparatus 5 according to the seventh embodiment of the present invention. FIG. 17B shows formats and contents of an ATM cell at positions denoted by (a), (a1), (a2), (b), (c), and (d) shown in FIG. 17A.

A VPI number extracting and leaf IF unit number adding unit 532E in the leaf IF unit 53E extracts an input VPI number (VPIa) from an input ATM cell in an inter-apparatus cell format x of the leaf IF unit 53E (as denoted by (a) in FIG. 17). The VPI number extracting and leaf IF unit number adding unit 532E adds a leaf IF unit number (IF1) of the leaf IF unit 53E to the input VPI number (VPIa) and sends the resultant information to an intra-apparatus header adding unit 531E and an intra-apparatus ID conversion table 533E (as denoted by (a1) in FIG. 17). The intra-apparatus header adding unit 531E places the input information to the intra-apparatus header of the ATM cell in the intra-apparatus cell format y. In addition, the intra-apparatus header adding unit 531E converts the input VPI number (VPIa) in the input ATM cell into an intra-apparatus ID (for example, a 10-bit VPIa') with the intra-apparatus ID conversion table 533E and sends the resultant ID to the intra-apparatus header adding unit 531E. The intra-apparatus header adding unit 531E places the intra-apparatus ID to the VPI area of the ATM header in the intra-apparatus cell format y, copies other ATM cell information from the input ATM cell, places the copied information to the ATM payload in the intra-apparatus cell format y, and obtains a cell in the intra-apparatus cell format y. A VPI number, leaf IF unit number, and intra-apparatus ID extracting unit 511G of the converting unit 51G extracts the input VPI number (VPIa), the leaf IF unit number (IF1), and the intra-apparatus ID (VPIa') from the intra-apparatus header and the ATM header of the cell in the intra-apparatus cell format y and sends the input VPI number (VPIa) and the leaf IF unit number (IF1) to a header processing unit 512G and the intra-apparatus ID (VPIa') to a path designation header conversion table 513G. The header processing unit 512G obtains output destination information (output VPI number (VPIe) and root IF unit number (IF2)) from the path designation header conversion table 513G (as denoted by (c) in FIG. 17B). The header processing unit 512G places the output VPI number (VPIe) obtained from the path designation header conversion table 513G to the VPI area of the ATM header, copies other information including the intra-apparatus header from the input information, generates a cell in the intra-apparatus cell format y (as denoted by (d) in FIG. 17B), and sends the cell to the root IF unit 54A (IF2) corresponding to the root IF unit number (IF2) obtained from the path designation header conversion table 513G (as denoted by (d) in FIG. 17A).

As described above, the controlling unit 5B controls the rewriting process for the path designation header conversion table 513G when a connection is established or released. In addition, the controlling unit 52B controls a rewriting process for the intra-apparatus ID conversion table 533E when a connection is established or released. Controlling units 52C and 52D according to an eighth embodiment and a ninth embodiment have such a function.

In the path merging type communication apparatus 5 according to the seventh embodiment, since a control ATM cell merged by the converting unit 51G and sent to the controlling unit 52B by the root IF unit 54A contains input path information (the input VPI number (VPIa) and the leaf IF unit number (IF1) of the leaf IF unit 53E), the controlling unit 52B can identify each pre-merged path (virtual path) from which the control cell has been received. Thus, a response cell to a request such as a band change request can be sent back to an upstream unit of a pre-merged path from which the request has been received as one-to-one communication. In addition, when the number of bits of the intra-apparatus ID is smaller than the number of bits of the VPI, the capacity of the path designation header conversion table 513G can be decreased.

In the eighth embodiment of the present invention, unlike with the seventh embodiment, a VCI instead of a VPI is used to identify a pre-merged path. FIG. 18 shows a leaf (input) IF unit 53F, a converting unit 51H, and a root (output) IF unit 54A of the path merging type communication apparatus 5 according to the eighth embodiment of the present invention. Although FIG. 17B shows formats and contents of an ATM cell corresponding to the seventh embodiment, when VPI numbers VPIa and VPIe and an intra-apparatus ID (VPIa') are substituted with an input VCI number, an output VCI number obtained from a path designation header conversion table 513H, and an intra-apparatus ID obtained from an intra-apparatus ID conversion table 533F corresponding to the leaf IF unit number of the leaf IF unit 53F and the input VCI number, the formats and contents of an ATM cell at positions denoted by (a), (a1), (a2), (b), (c), and (d) shown in FIG. 17B can be applied for the eighth embodiment shown in FIG. 18.

A VCI number extracting and leaf IF unit number adding unit 532F in the leaf IF unit 53F extracts an input VCI number from an input ATM cell in an inter-apparatus cell format x of the leaf IF unit 53F. The VCI number extracting and leaf IF unit number adding unit 532F adds a leaf IF unit number (IF1) of the leaf IF unit 53F to the input VCI number and sends the resultant information to an intra-apparatus header adding unit 531F and an intra-apparatus ID conversion table (as denoted by (a1) in FIG. 18). The intra-apparatus header adding unit 531F places the input information to the intra-apparatus header of the ATM cell in the intra-apparatus cell format y. In addition, the intra-apparatus header adding unit 531F converts the input VCI number in the input ATM cell into an intra-apparatus ID (for example, 10 bits) with the intra-apparatus ID conversion table 533F and sends the resultant ID to the intra-apparatus header adding unit 531F. The intra-apparatus header adding unit 531F places the intra-apparatus ID to the VCI area of the ATM header in the intra-apparatus cell format y, copies other ATM cell information from the input ATM cell, places the copied information to the ATM payload in the intra-apparatus cell format y (as denoted by (a2) in FIG. 18), and obtains a cell in the intra-apparatus cell format y. A VCI number, leaf IF unit number, and intra-apparatus ID extracting unit 511H of the converting unit 51H extracts the input VCI number, the leaf IF unit number (IF1), and the intra-apparatus ID from the intra-apparatus header and the ATM header of the cell in the intra-apparatus cell format y and sends the input VCI number and the leaf IF unit number (IF1) to a header processing unit 512H and the intra-apparatus ID to a path designation header conversion table 513H (as denoted by (b) in FIG. 18). The header processing unit 512H obtains output destination information (output VCI number and root IF unit number (IF2)) from the path designation header conversion table 513H (as denoted by (c) in FIG. 18B). The header processing unit 512H places the output VCI number obtained from the path designation header conversion table 513H to the VCI area of the ATM header, copies other information including the intra-apparatus header from the input information received from the VCI number, leaf IF unit number, and intra-apparatus ID extracting unit 511H and the leaf IF unit 53F, generates a cell in the intra-apparatus cell format y, and sends the cell to the root IF unit 54A (IF2) corresponding to the root IF unit number (IF2) obtained from the path designation header conversion table 513H (as denoted by (d) in FIG. 18A).

In the path merging type communication apparatus 5 according to the eighth embodiment, since a control ATM cell merged by the converting unit 51H and sent to the controlling unit 52C by the root IF unit 54A contains input path information (the input VCI number and the leaf IF unit number (IF1)), the controlling unit 52C can identify each pre-merged path from which the control cell has been received for each channel (virtual channel). Thus, a response cell to a request such as a band change request can be sent back to an upstream unit of a pre-merged path on the virtual channel from which the request has been received as one-to-one communication. In addition, when the number of bits (bit length) of the intra-apparatus ID is smaller than the number of bits (bit length) of the VCI, the capacity of the path designation header conversion table 513H can be decreased.

Figure 19:
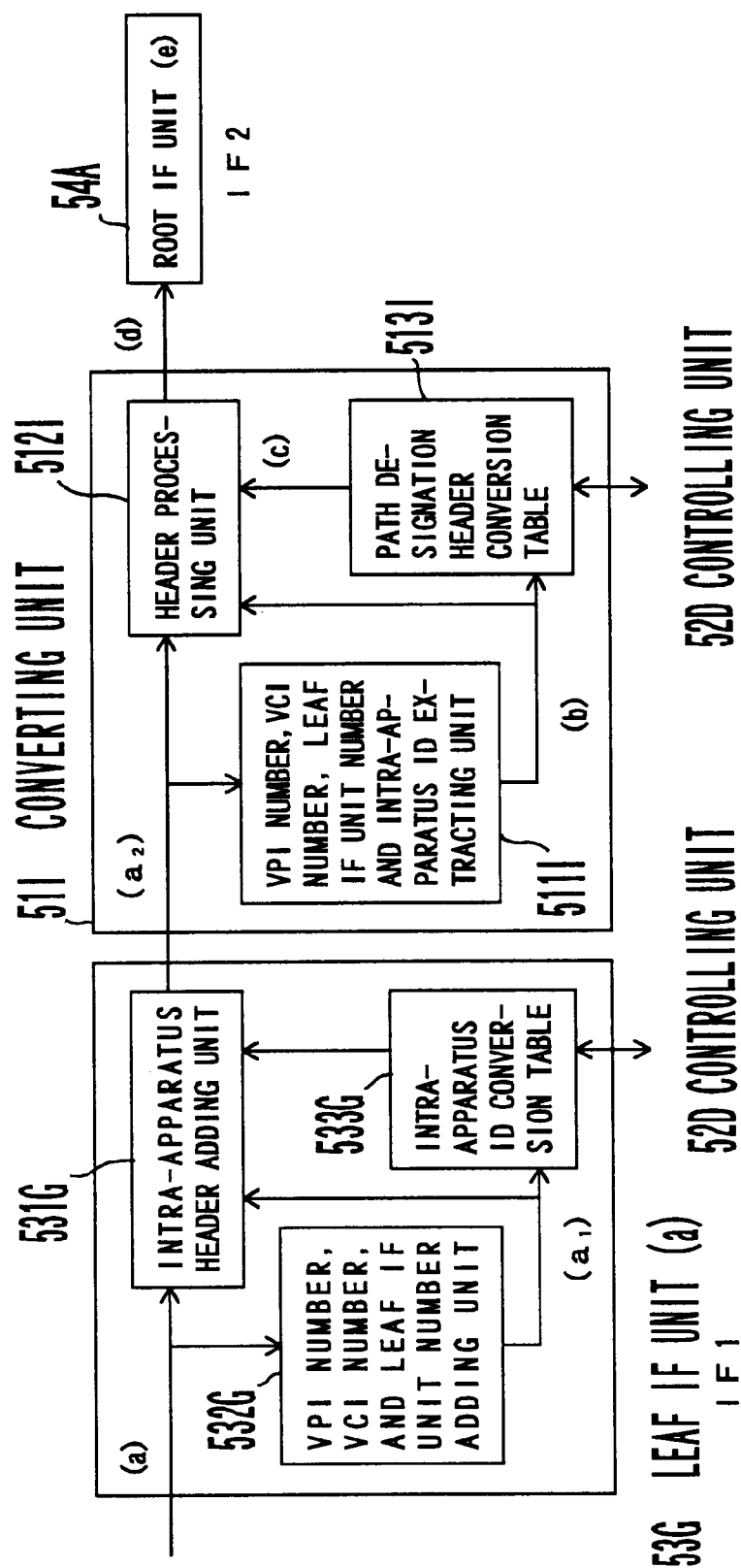
FIG. 19 is a block diagram showing the structures of a leaf IF unit, a converting unit, and a root IF unit of a path merging type communication apparatus according to a ninth embodiment of the present invention.

In the ninth embodiment of the present invention, unlike with the seventh and eighth embodiments, both a VPI and a VCI are used to identify a pre-merged path. FIG. 19 shows a leaf (input) IF unit 53G, a converting unit 51I, and a root (output) IF unit 54A of the path merging type communication apparatus 5 according to the ninth embodiment of the present invention. Although FIG. 17B shows formats and contents of an ATM cell corresponding to the seventh embodiment, when an input VCI number of the ATM header of the input ATM cell of the leaf IF unit 53G and an output VCI number obtained from a path designation header conversion table 513I are added to the VCI numbers VCIa and VCIe and the intra-apparatus ID (VPIa') is substituted with an intra-apparatus ID obtained from an intra-apparatus ID conversion table 533G corresponding to the leaf IF unit number of the leaf IF unit 53G and the input VCI number, the formats and contents of an ATM cell at positions denoted by (a), (a1), (a2), (b), (c), and (d) shown in FIG. 17B can be applied for the ninth embodiment shown in FIG. 19.

A VPI number/VCI number extracting and leaf IF unit number adding unit 532G in the leaf IF unit 53G extracts an input VPI number and an input VCI number from an input ATM cell in an inter-apparatus cell format x of the leaf IF unit 53G (as denoted by (a) in FIG. 19). The VPI number/VCI number extracting and leaf IF unit number adding unit 532G adds a leaf IF unit number (IF1) of the leaf IF unit 53G to the input VPI number and the input VCI number and sends the resultant information to an intra-apparatus header adding unit 531G (as denoted by (a1) in FIG. 19). The intra-apparatus header adding unit 531G places the input information to the intra-apparatus header of the ATM cell in the intra-apparatus cell format y. In addition, the intra-apparatus header adding unit 531G converts the input VPI number (VPIa) and the input VCI number in the input ATM cell into an intra-apparatus ID (for example, 10 bits) with the intra-apparatus ID conversion table 533G and sends the resultant ID to the intra-apparatus header adding unit 531G. The intra-apparatus header adding unit 531G places the intra-apparatus ID to the VPI area of the ATM header in the intra-apparatus cell format y, copies other ATM cell information from the input ATM cell, places the copied information to the ATM payload in the intra-apparatus cell format y (as denoted by (a2) in FIG. 19), and obtains a cell in the intra-apparatus cell format y. A VPI number, VCI number, leaf IF unit number, and intra-apparatus ID extracting unit 511I of the converting unit 51I extracts the input VPI number (VPIa), the input VCI number, the leaf IF unit number (IF1), and the intra-apparatus ID from the intra-apparatus header and the ATM header of the cell in the intra-apparatus cell format y and sends the input VPI number (VPIa), the input VCI number, and the leaf IF unit number (IF1) to a header processing unit 512I and the intra-apparatus ID to a path designation header conversion table 513I (as denoted by (b) in FIG. 19). The header processing unit 512I obtains output destination information (output VPI number (VPIe), output VCI number, and root IF unit number (IF2)) from the path designation header conversion table 513I (as denoted by (c) in FIG. 19). The header processing unit 512I places the output VPI number and the output VCI number obtained from the path designation header conversion table 513I to the VPI area and the VCI area of the ATM header, copies other information including the intra-apparatus header from the input information received from the VPI number, VCI number, leaf IF unit number, and intra-apparatus ID extracting unit 511I and the leaf IF unit 53G, generates a cell in the intra-apparatus cell format y, and sends the cell to the root IF unit 54A corresponding to the root IF unit number (IF2) obtained from the path designation header conversion table 513I (as denoted by (d) in FIG. 19).

In the path merging type communication apparatus 5 according to the ninth embodiment, since a control ATM cell merged by the converting unit 51I and sent to the controlling unit 52D by the root IF unit 54A contains input path information (the input VPI number (VPIa), the input VCI number, and the leaf IF unit number (IF1) of the leaf IF unit 53G), the controlling unit 52D can identify each pre-merged path from which the control cell has been received for each channel (virtual channel) accommodated in the path (virtual path). Thus, a response cell to a request such as a band change request can be sent back to an upstream unit of a pre-merged path on the virtual channel from which the request has been received as one-to-one communication. In addition, when the number of bits of the intra-apparatus ID is smaller than the number of bits of each of the VPI and the VCI, the capacity of the path designation header conversion table 513I can be decreased.

Figure 20A:
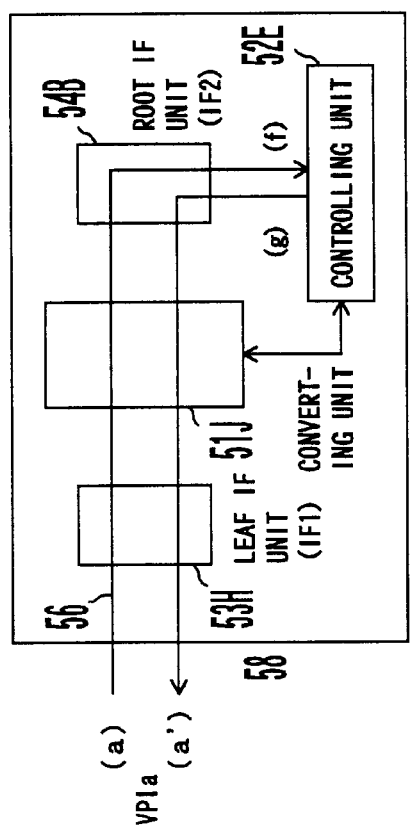
FIG. 20A is a block diagram showing the structures of a leaf IF unit, a converting unit, and a root IF unit of a path merging type communication apparatus according to a tenth embodiment of the present invention.
Figure 20B:
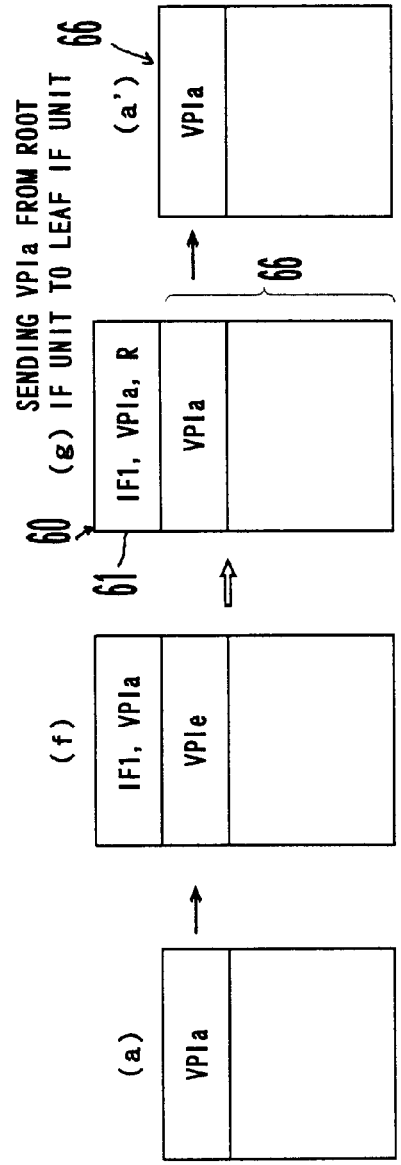
FIG. 20B is a schematic diagram showing formats and data transitions of an ATM cell processed by the path merging type communication apparatus shown in FIG. 20A.

FIGS. 20A and 20B show a tenth embodiment of the present invention. In the path merging type communication apparatus 5 shown in FIG. 6, the leaf IF unit 53 receives a control cell. After the control cell is processed in the converting unit 51, the root IF unit 54, and the controlling unit 52, a response cell against the control cell is directly sent to the leaf IF unit 53. In contrast, as shown in FIG. 20A, in a path merging type communication apparatus 5A according to the tenth embodiment, a controlling unit 52E sends a response cell against an ATM control cell received from the root IF unit 54B to the root IF unit 54B. The cell is sent back to the sender of the ATM control cell through a reverse path 58 of the input path 56, a converting unit 51J, and a leaf IF unit 53H.

FIG. 20B shows formats and contents of an ATM cell at positions denoted by (a), (f), (g), and (a') of the tenth embodiment shown in FIG. 20A. As shown in FIG. 20B, the root IF unit 54B and the converting unit 51J are structured in the following manner. The intra-apparatus header 61 of a first response cell 60 in an intra-apparatus cell format y has an R flag as shown in FIG. 8D. When the value of the flag is "1", the first response cell 60 in the intra-apparatus cell format y sent from the controlling unit 52E to the root IF unit 54B is routed to the leaf IF unit 53H (IF1) and the converting unit 51J. The intra-apparatus header 61 is removed from the first response cell 60 in the intra-apparatus cell format y generated by the controlling unit 52E in any position from the controlling unit 52E to the leaf IF unit 53H (for example, the converting unit 51J or the leaf IF unit 53H). The resultant cell is sent back as a second response cell 66 in the inter-apparatus cell format x to the sender of the control cell.

In an embodiment, after the root IF unit 54 has received the first response cell 60 against the ATM control cell from the controlling unit 52E, the root IF unit 54 sends the first response cell to the converting unit 51J. After the converting unit 51J has received the first response cell 60, when the value of the R flag of the first response cell 60 is "1", the converting unit 51J sends the first response cell 60 to the leaf IF unit 53H with the leaf IF unit number contained in the first response cell 60. The leaf IF unit 53H removes the intra-apparatus header 61 from the first response cell 60 received from the converting unit 51J and sends the resultant cell as a second response cell 66 to the path 58.

In another embodiment, the converting unit 51J instead of the leaf IF unit 53H removes the intra-apparatus header 61 from the first response cell 60 and sends the resultant cell as a second response cell 66 to the leaf IF unit 53H with the leaf IF unit number contained in the intra-apparatus header 61 of the first response cell 60. The leaf IF unit 53H sends the second response cell 66 to the path 58.

The intra-apparatus header 61 denoted by (g) in FIG. 20B contains an input VPI number (VPIa). However, the intra-apparatus header 61 may not contain the input VPI number. Thus, the size of the first response cell sent from the controlling unit 52E to the root IF unit 54B can be decreased.

The structure of the path merging type communication apparatus 5 that sends back the second response cell 66 through the root IF unit 54B can be applied to all the first to ninth embodiments of the present invention. Thus, the structures of the converting unit 51 and the leaf IF unit 53 according to the first to ninth embodiments can be employed. The root IF unit 54B may contain the intra-apparatus header removing unit 542A and the control cell detecting unit 541A shown in FIG. 10A. However, unlike with the first to ninth embodiments, the second response cell 66 generated by the controlling unit 52E corresponding to an ATM control cell is sent to the leaf IF unit 53H through the root IF unit 54B and the converting unit 51J. Even if the tenth embodiment is combined with one of the first to ninth embodiments, the present invention can be accomplished without deterioration of remarkable effects of these embodiments.

FIG. 21 shows an eleventh embodiment of the present invention. In a path merging type communication apparatus 5B according to the eleventh embodiment, a control cell detecting unit 541 (not shown in FIG. 21; see FIG. 4) of a root IF unit 54C detects a control cell in an intra-apparatus cell format y and sends the control cell to a control cell rewriting unit 543C. The control cell rewriting unit 543C sends only required control data in a format (not shown) different from the intra-apparatus cell format y to a controlling unit 52F. Input information such as an input VPI number contained in the intra-apparatus header in the intra-apparatus cell format y is contained in a control cell rewriting unit 543C. The controlling unit 52F controls the path merging type communication apparatus 5B corresponding to the required control data and sends back response information against the control cell to the control cell rewriting unit 543C. The control cell rewriting unit 543C places the input information to the ATM header of the cell in the inter-apparatus cell format x. In addition, the control cell rewriting unit 543C places the response information received from the controlling unit 52F to the ATM payload of the cell in the inter-apparatus cell format x and thereby generates a response cell in the inter-apparatus cell format x. The response cell is sent back to a relevant leaf IF unit 53I (53Ia, 53Ib, or 53Ic) through a converting unit 51K. As with the tenth embodiment, the root IF unit 54C and the converting unit 51K can be structured in the following manner. An R flag as shown in FIG. 8D is placed in the intra-apparatus header. When the value of the flag is "1", the cell is routed to the leaf IF unit 53I.

The structure of the path merging type communication apparatus 5B can be applied to all the first to ninth embodiments of the present invention. Thus, the structures of the converting unit 51 and the leaf IF unit 53 according to the first to ninth embodiments can be employed. The root IF unit 54C may contain the intra-apparatus header removing unit 542A and the control cell detecting unit 541A shown in FIG. 10A. However, unlike with the first to ninth embodiments, a response cell generated by the controlling unit 52F corresponding to an ATM control cell is sent to the control cell rewriting unit 543C of the root IF unit 54C. The control cell rewriting unit 543C adds input information to the response cell and sends the resultant cell in the inter-apparatus cell format x to the leaf IF unit 53I through the converting unit 51K. Even if the eleventh embodiment is combined with one of the first to ninth embodiments, the present invention can be accomplished without deterioration of remarkable effects of these embodiments.

Figure 22:
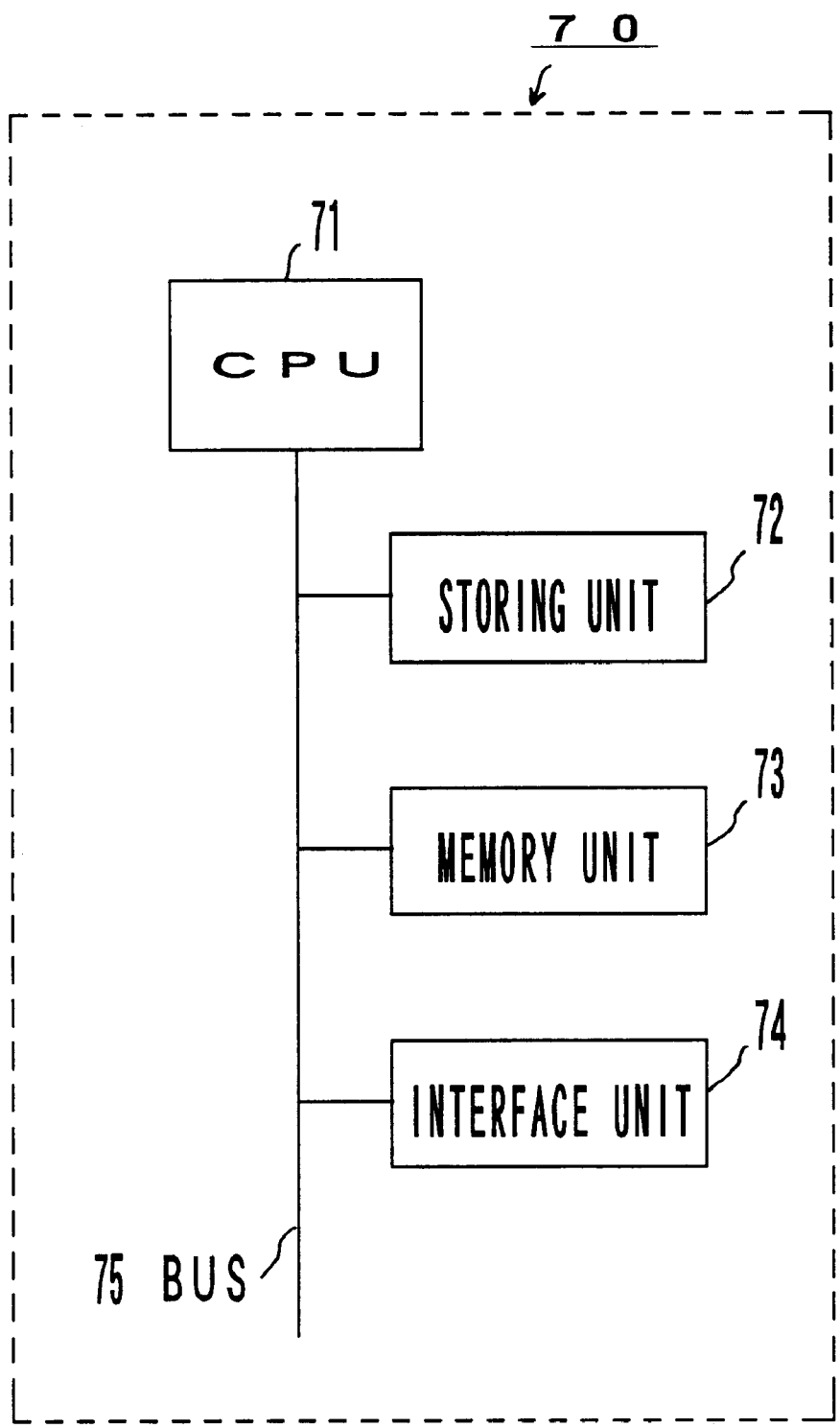
FIG. 22 is a block diagram showing the structures of a leaf IF unit, a converting unit, and a root IF unit of a path merging type communication apparatus according to a twelfth embodiment of the present invention.

A program that accomplishes the method of the present invention can be executed on a computer 70 with a hardware structure as shown in FIG. 22. The computer 70 comprises a CPU 71, a storing unit 72, a memory unit 73, and a interface unit 74 that are connected to a bus 75. The CPU 71 performs processes necessary for searching data from a path designation header conversion table, moving data, and copying data. The storing unit 72 stores data of the conversion table and a program that is necessary for embodying the present invention and that is executed by the CPU 71. When the present invention is embodied, such data and program are loaded to the memory unit 73. The interface unit 74 interfaces commands issued by the program to each unit necessary for embodying the present invention. The structure shown in FIG. 22 is only an example for embodying the present invention. Thus, various structures can be considered. Such structures can be accomplished by any structural unit of the path merging type communication apparatus 5, 5A, and 5B. In addition, each structural unit can be distributed or multiplexed.

According to the present invention, a VPI and a VCI contained in an ATM cell of a sender and information such as an IF unit number of a leaf IF unit are added to an input ATM cell and stored in a path merging type communication apparatus. Thus, corresponding to information of a cell that has been merged, a connection between an upstream path merging type communication apparatus or an ATM terminal unit and the path merging type communication apparatus according to the present invention can be identified for each path (virtual path) or for each channel (virtual channel) accommodated in a path (virtual path) and communicated therebetween.

Thus, the path merging type communication apparatus according to the present invention can send back a response cell against an ATM control cell for requesting a band change to an upstream apparatus (namely, a sender of the ATM control cell) on a path or a channel through which the ATM control cell is received.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A path merging communication apparatus having:
 a plurality of leaf interface (IF) units for receiving ATM cells from different paths,
 a converting unit, connected to the leaf IF units, for receiving the input ATM cells from the different paths, merging the ATM cells, and designating one path to which the merged ATM cells are sent corresponding to a predetermined manner,
 a controlling unit, connected to the converting unit, for controlling the apparatus and control information, and
 a root IF unit, connected to the converting unit and the controlling unit, for sending the ATM cells merged by the converting unit to the path designated by the converting unit,
 wherein the converting unit comprises:
  an input path information extracting unit for extracting input path identification information and a leaf IF unit number for identifying a leaf IF unit from which the input ATM cell is received from the input ATM cell;
  a path designation header conversion table for converting the input path identification information and the leaf IF unit number into output path identification information for identifying an output destination of the input ATM cell and a root IF unit number for identifying the root IF unit to which the input ATM cell is sent; and
  a header processing unit for rewriting the input path identification information contained in a path information storing area of the input ATM cell to the output path identification information obtained from said path designation header conversion table, adding an intra-apparatus header containing the input path identification information and the leaf IF unit number to the input ATM cell, generating an output ATM cell, and sending the output ATM cell to the root IF unit with the root IF unit number obtained from the path designation header conversion table,
 wherein the root IF unit comprises:
  a control cell detecting unit for detecting an output ATM cell that contains a control cell to be sent to the controlling unit from output ATM cells that are received from the converting unit and sending the detected output ATM cell to the controlling unit; and
  an intra-apparatus header removing unit for removing the intra-apparatus header from the output ATM cell received from the converting unit and sending the resultant ATM cell to a path in which the ATM cell is merged, and
 wherein the controlling unit performs a process corresponding to information of the control cell in the output ATM cell received from the root IF unit, generates a response cell that contains the input path identification information and information of the process result corresponding to the input path identification information and the leaf IF unit number contained in the intra-apparatus header of the control cell, and sends the response cell to a leaf IF unit having the leaf IF unit number so as to send the response cell to a path identified by the input path identification information.

2. The path merging communication apparatus as set forth in claim 1,
 wherein the input path identification information is an input VPI number;
 wherein the output path identification information is an output VPI number; and
 wherein the path information storing area is a VPI area in an ATM header.

3. The path merging communication apparatus as set forth in claim 1,
 wherein the input path identification information is an input VCI number;

wherein the output path identification information is an output VCI number; and wherein the path information storing area is a VCI area in an ATM header.

4. The path merging communication apparatus as set forth in claim 1, wherein the input path identification information is an input VPI number and an input VCI number;

wherein the output path identification information is an output VPI number and an output VCI number; and wherein the path information storing area is a VPI area and a VCI area in an ATM header.

5. A path merging communication apparatus having:

a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the leaf IF unit comprises:

an input path information extracting unit for extracting input path identification information and a leaf IF unit number for identifying a leaf IF unit from which an input ATM cell is received from the input ATM cell; and an intra-apparatus header adding unit for adding an intra-apparatus header containing the input path identification information and the leaf IF unit number to the input ATM cell, generating an intra-apparatus ATM cell, and sending the intra-apparatus ATM cell to the converting unit, wherein the converting unit comprises:

an input path identification information extracting unit for extracting the input path identification information and the leaf IF unit number from an intra-apparatus header of the input intra-apparatus ATM cell;

a path designation header conversion table for converting the input path identification information and the leaf IF unit number into output path identification information for identifying an output destination of the input ATM cell and a root IF unit number for identifying the root IF unit to which the input ATM cell is sent; and a header processing unit for rewriting the input path identification information contained in a path information storing area of the intra-apparatus ATM cell to output path identification information obtained from said path designation header conversion table, converting the intra-apparatus ATM cell into an output ATM cell, and sending the output ATM cell to the root IF unit having a root IF unit number obtained from said path designation header conversion table, wherein the root IF unit comprises:

a control cell detecting unit for detecting an output ATM cell that contains a control cell to be sent to the controlling unit from output ATM cells that are received from the converting unit and sending the detected output ATM cell to the controlling unit; and an intra-apparatus header removing unit for removing the intra-apparatus header from the output ATM cell received from the converting unit and sending the resultant ATM cell to a path in which the ATM cell is merged, and wherein the controlling unit performs a process corresponding to information of the control cell in the output ATM cell received from the root IF unit, generates a response cell that contains the input path identification information and information of the process result corresponding to the input path identification information and the leaf IF unit number contained in the intra-apparatus header of the control cell, and sends the response cell to a leaf IF unit having the leaf IF unit number so as to send the response cell to a path identified by the input path identification information.

6. The path merging communication apparatus as set forth in claim 5, wherein the input path identification information is an input VPI number;

wherein the output path identification information is an output VPI number; and wherein the path information storing area is a VPI area in an ATM header.

7. The path merging communication apparatus as set forth in claim 5, wherein the input path identification information is an input VCI number;

wherein the output path identification information is an output VCI number; and wherein the path information storing area is a VCI area in an ATM header.

8. The path merging communication apparatus as set forth in claim 5, wherein the input path identification information is an input VPI number and an input VCI number;

wherein the output path identification information is an output VPI number and an output VCI number; and wherein the path information storing area is a VPI area and a VCI area in an ATM header.

9. A path merging communication apparatus having:

a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the leaf IF unit comprises:

a first input path information extracting unit for extracting input path identification information and a leaf IF unit number for identifying a leaf IF unit from which the input ATM cell is received from the input ATM cell;

an intra-apparatus ID conversion table for converting the extracted input path identification information and leaf IF unit number into an intra-apparatus ID; and an intra-apparatus header adding unit for rewriting the input path identification information contained in a path information storing area of the input ATM cell to the intra-apparatus ID obtained from said intra-apparatus ID conversion table, adding an intra-apparatus header containing the extracted input path identification information and leaf IF unit number to the input ATM cell, generating an intra-apparatus ATM cell, and sending the intra-apparatus ATM cell to the converting unit, wherein the converting unit comprises:
    a second input path information extracting unit for extracting input path identification information, the leaf IF unit number, and the intra-apparatus ID from the input intra-apparatus ATM cell;
    a path designation header conversion table for converting the extracted intra-apparatus ID into output path identification information for identifying an output designation of an output ATM cell and a root IF unit number of the root IF unit to which the output ATM cell is sent; and
    a header processing unit for rewriting the intra-apparatus ID contained in a path information storing area of the intra-apparatus ATM cell to the output path identification information obtained from said path designation header conversion table, generating an output ATM cell, and sending the output ATM cell to the root IF unit having the root IF unit number obtained from said path designation header conversion table, wherein the root IF unit comprises:
    a control cell detecting unit for detecting an output ATM cell that contains a control cell to be sent to the controlling unit from output ATM cells that contain the intra-apparatus header and are received from the converting unit and sending the detected output ATM cell to the controlling unit; and
    an intra-apparatus header removing unit for removing the intra-apparatus header from the output ATM cell received from the converting unit and sending the resultant ATM cell to a path in which the ATM cell is merged, and wherein the controlling unit performs a process corresponding to information of the control cell in the output ATM cell received from the root IF unit, generates a response cell that contains the input path identification information and information of the process result corresponding to the input path identification information and the leaf IF unit number contained in the intra-apparatus header of the control cell, and sends the response cell to a leaf IF unit having the leaf IF unit number so as to send the response cell to a path identified by the input path identification information.

10. The path merging communication apparatus as set forth in claim 9,
    wherein the bit length of the intra-apparatus ID is smaller than the bit length of the input path identification information.

11. The path merging communication apparatus as set forth in claim 9,
    wherein the input path identification information is an input VPI number;
    wherein the output path identification information is an output VPI number; and
    wherein the path information storing area is a VPI area in an ATM header.

12. The path merging communication apparatuses set forth in claim 9,
    wherein the input path identification information is an input VCI number;
    wherein the output path identification information is an output VCI number; and
    wherein the path information storing area is a VCI area in an ATM header.

13. The path merging communication apparatus as set forth in claim 9,
    wherein the input path identification information is an input VPI number and an input VCI number;
    wherein the output path identification information is an output VPI number and an output VCI number; and
    wherein the path information storing area is a VPI area and a VCI area in an ATM header.

14. A path merging communication apparatus having:
    a plurality of leaf interface (IF) units for receiving ATM cells from different paths,
    a converting unit, connected to the leaf IF units, for receiving the input ATM cells from the different paths, merging the ATM cells, and designating one path to which the merged ATM cells are sent corresponding to a predetermined manner,
    a controlling unit, connected to the converting unit, for controlling the apparatus and control information, and
    a root IF unit, connected to the converting unit and the controlling unit, for sending the ATM cells merged by the converting unit to the path designated by the converting unit, wherein the converting unit comprises:
    an input path information extracting unit for extracting input path identification information and a leaf IF unit number for identifying a leaf IF unit from which the input ATM cell is received from the input ATM cell;
    a path designation header conversion table for converting the input path identification information and the leaf IF unit number into output path identification information for identifying an output destination of the input ATM cell and a root IF unit number for identifying the root IF unit to which the input ATM cell is sent; and
    a header processing unit for rewriting the input path identification information contained in a path information storing area of the input ATM cell to the output path identification information obtained from said path designation header conversion table, adding a first intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises:
    a control cell detecting unit for detecting an output ATM cell that contains a control cell to be sent to the controlling unit from output ATM cells that contain the first intra-apparatus header and are received from the converting unit and sending the detected output ATM cell to the controlling unit; and
    an intra-apparatus header removing unit for removing the first intra-apparatus header from the output ATM cell received from the converting unit and sending the resultant ATM cell to a path in which the ATM cell is merged, wherein the controlling unit performs a process corresponding to information of the control cell in the output ATM cell received from the root IF unit, generates a first response cell that contains information of the process result that is the input path identification information contained in a path information storing area corresponding to the input path identification information and a leaf IF unit number contained in the first intra-apparatus header added to the control cell, adds a second intra-apparatus header that contains the leaf IF unit number and predetermined routing command information to the first response cell, generates a second response cell, and sends the second response cell to the root IF unit, wherein the root IF unit sends the second response cell to the converting unit after receiving the second response cell, and wherein the converting unit sends the first response cell to a leaf IF unit identified by the leaf IF unit number corresponding to the predetermined routing command information and a leaf IF unit number contained in the second intra-apparatus header of the second response cell after receiving the second response cell so as to send the response cell to a path identified by the input path identification information.

15. A path merging communication apparatus having:
a plurality of leaf interface (IF) units for receiving ATM cells from different paths,
a converting unit, connected to the leaf IF units, for receiving the input ATM cells from the different paths, merging the ATM cells, and designating one path to which the merged ATM cells are sent corresponding to a predetermined manner,
a controlling unit, connected to the converting unit, for controlling the apparatus and control information, and
a root IF unit, connected to the converting unit and the controlling unit, for sending the ATM cells merged by the converting unit to the path designated by the converting unit,
wherein the converting unit comprises:
an input path information extracting unit for extracting input path identification information and a leaf IF unit number for identifying a leaf IF unit from which the input ATM cell is received from the input ATM cell;
a path designation header conversion table for converting the input path identification information and the leaf IF unit number into output path identification information for identifying an output destination of the input ATM cell and a root IF unit number for identifying the root IF unit to which the input ATM cell is sent; and
a header processing unit for rewriting the input path identification information contained in a path information storing area of the input ATM cell to the output path identification information obtained from said path designation header conversion table, adding a first intra-apparatus header containing the input path identification information and the leaf IF unit number to the input ATM cell, generating an output ATM cell, and sending the output ATM cell to the root IF unit having the root IF unit number obtained from the path designation header conversion table,
wherein the root IF unit comprises:
a control cell detecting unit for detecting an output ATM cell that contains a control cell to be sent to the controlling unit from output ATM cells that contain the first intra-apparatus header and are received from the converting unit and sending the detected output ATM cell to the controlling unit; and
an intra-apparatus header removing unit for removing the intra-apparatus header from the output ATM cell received from the converting unit and sending the resultant ATM cell to a path in which the ATM cell is merged, wherein the controlling unit performs a process corresponding to information of the control cell in the output ATM cell received from the root IF unit, generates a first response cell that contains information of the process result that is the input path identification information contained in a path information storing area corresponding to the input path identification information and a leaf IF unit number contained in the first intra-apparatus header added to the control cell, adds a second intra-apparatus header that contains the leaf IF unit number, the input path identification information, and predetermined routing command information to the first response cell, generates a second response cell, and sends the second response cell to the root IF unit, wherein the root IF unit sends the second response cell to the converting unit after receiving the second response cell, wherein the converting unit sends the first response cell to a leaf IF unit identified by the leaf IF unit number corresponding to the predetermined routing command information and a leaf IF unit number contained in the second intra-apparatus header of the second response cell after receiving the second response cell, and wherein the leaf IF unit sends the second response cell to a path identified by the input path identification information contained in the second intra-apparatus header after receiving the second response cell.

16. A path merging communication apparatus having:
a plurality of leaf interface (IF) units for receiving ATM cells from different paths,
a converting unit, connected to the leaf IF units, for receiving the input ATM cells from the different paths, merging the ATM cells, and designating one path to which the merged ATM cells are sent corresponding to a predetermined manner,
a controlling unit, connected to the converting unit, for controlling the apparatus and control information, and
a root IF unit, connected to the converting unit and the controlling unit, for sending the ATM cells merged by the converting unit to the path designated by the converting unit,
wherein the converting unit comprises:
an input path information extracting unit for extracting input path identification information and a leaf IF unit number for identifying a leaf IF unit from which the input ATM cell is received from the input ATM cell;
a path designation header conversion table for converting the input path identification information and the leaf IF unit number into output path identification information for identifying an output destination of the input ATM cell and a root IF unit number for identifying the root IF unit to which the input ATM cell is sent; and
a header processing unit for rewriting the input path identification information contained in a path information storing area of the input ATM cell to the output path identification information obtained from said path designation header conversion table, adding an intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises:

a control cell detecting unit for detecting an output ATM cell that contains a control cell from output ATM cells that are received from the converting unit and sending the detected output ATM cell to the control cell rewriting unit;

an intra-apparatus header removing unit for removing the intra-apparatus header from the output ATM cell received from the converting unit and sending the resultant ATM cell to a path in which the ATM cell is merged; and a control cell rewriting unit for sending only information for controlling the path merging type communication apparatus of the information contained in the control cell to the controlling unit, storing input path identification information and a leaf IF unit number contained in an intra-apparatus header of the control cell, receiving information against the control result from the controlling unit, generating a first response cell containing the leaf IF unit number, the input path identification information, and information of the process result corresponding to information of the received control result and the input path identification information and the leaf IF unit number contained in the intra-apparatus header, and sending the first response cell to the converting unit, wherein the controlling unit performs a process corresponding to the control information received from said control cell rewriting unit and sends the control result to said control cell rewriting unit, and wherein the unit sends a second response cell of which the leaf IF unit number is removed from the first response cell to a path identified by the input path identification information.

17. A path merging communication apparatus having:

a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, wherein the converting unit comprises:

an input path information extracting unit for extracting input path identification information and a leaf IF unit number for identifying a leaf IF unit from which the input ATM cell is received from the input ATM cell;

a path designation header conversion table for converting the input path identification information and the leaf IF unit number into output path identification information for identifying an output destination of the input ATM cell and a root IF unit number for identifying the root IF unit to which the input ATM cell is sent; and a header processing unit for rewriting the input path identification information contained in a path information storing area of the input ATM cell to the output path identification information obtained from said path designation header conversion table, adding an intra-apparatus header containing the input path identification information and the leaf IF unit number to the input ATM cell, generating an output ATM cell, and sending the output ATM cell to the root IF unit having the root IF unit number obtained from the path designation header conversion table, wherein the root IF unit comprises:

a control cell detecting unit for detecting an output ATM cell that contains a control cell from output ATM cells that are received from the converting unit and sending the detected output ATM cell to the control cell rewriting unit;

an intra-apparatus header removing unit for removing the intra-apparatus header from the output ATM cell received from the converting unit and sending the resultant ATM cell to a path in which the ATM cell is merged; and a control cell rewriting unit for sending only information for controlling the path merging type communication apparatus of the information contained in the control cell to the controlling unit, storing input path identification information and a leaf IF unit number contained in an intra-apparatus header of the control cell, receiving information against the control result from the controlling unit, generating a first response cell containing the leaf IF unit number, the input path identification information, and information of the process result corresponding to information of the received control result and the input path identification information and the leaf IF unit number contained in the intra-apparatus header, and sending the first response cell to the converting unit, wherein the controlling unit performs a process corresponding to the control information received from said control cell rewriting unit and sends the control result to said control cell rewriting unit, and wherein the converting unit sends a second response of which the leaf IF unit number is removed from the first response cell to a leaf IF unit identified by the leaf IF unit number so as to send the response cell to a path identified by the input path identification information.

18. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add an intra-apparatus header containing the input path identification information and the leaf IF unit number to the input ATM cell, to generate an output ATM cell, and to send the output ATM cell to the root IF unit with the root IF unit number obtained from the path designation header conversion table;

causing the root IF unit to detect an output ATM cell that contains a control cell to be sent to the controlling unit from output ATM cells that are received from the converting unit, to send the detected output ATM cell to the controlling unit, to remove the intra-apparatus header from the output ATM cell received from the converting unit, and to send the resultant ATM cell to a path in which the ATM cell is merged; and causing the controlling unit to perform a process corresponding to information of the control cell in the output ATM cell received from the root IF unit, to generate a response cell that contains the input path identification information and information of the process result corresponding to the input path identification information and the leaf IF unit number contained in the intra-apparatus header of the control cell, and to send the response cell to a leaf IF unit having the leaf IF unit number so as to send the response cell to a path identified by the input path identification information.

19. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the leaf IF unit to extract input path identification information and a leaf IF unit number for identifying a leaf IF unit from which an input ATM cell is received from the input ATM cell, to add an intra-apparatus header containing the input path identification information and the leaf IF unit number to the input ATM cell, to generate an intra-apparatus ATM cell, and to send the intra-apparatus ATM cell to the converting unit;

causing the converting unit to extract the input path identification information and the leaf IF unit number from an intra-apparatus header of the input intra-apparatus ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the intra-apparatus ATM cell to output path identification information obtained from the path designation header conversion table, to convert the intra-apparatus ATM cell into an output ATM cell, and to send the output ATM cell to the root IF unit having a root IF unit number obtained from the path designation header conversion table;

causing the root IF unit to detect an output ATM cell that contains a control cell to be sent to the controlling unit from output ATM cells that are received from the converting unit, to send the detected output ATM cell to the controlling unit, to remove the intra-apparatus header from the output ATM cell received from the converting unit, and to send the resultant ATM cell to a path in which the ATM cell is merged; and causing the controlling unit to perform a process corresponding to information of the control cell in the output ATM cell received from the root IF unit, to generate a response cell that contains the input path identification information and information of the process result corresponding to the input path identification information and the leaf IF unit number contained in the intra-apparatus header of the control cell, and to send the response cell to a leaf IF unit having the leaf IF unit number so as to send the response cell to a path identified by the input path identification information.

20. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the leaf IF unit to extract input path identification information and a leaf IF unit number for identifying a leaf IF unit from which the input ATM cell is received from the input ATM cell, to convert the extracted input path identification information and leaf IF unit number into an intra-apparatus ID, to rewrite the input path identification information contained in a path information storing area of the input ATM cell to the intra-apparatus ID obtained from the intra-apparatus ID conversion table, to add an intra-apparatus header containing the extracted input path identification information and leaf IF unit number to the input ATM cell, to generate an intra-apparatus ATM cell, and to send the intra-apparatus ATM cell to the converting unit;

causing the converting unit to extract input path identification information, the leaf IF unit number, and the intra-apparatus ID from the input intra-apparatus ATM cell, to convert the extracted intra-apparatus ID into output path identification information for identifying an output designation of an output ATM cell and a root IF unit number of the root IF unit to which the output ATM cell is sent, to rewrite the intra-apparatus ID contained in a path information storing area of the intra-apparatus ATM cell to the output path identification information obtained from the path designation header conversion table, to generate an output ATM cell, and to send the output ATM cell to the root IF unit having the root IF unit number obtained from the path designation header conversion table;

causing the root IF unit to detect an output ATM cell that contains a control cell to be sent to the controlling unit from output ATM cells that contain the intra-apparatus header and are received from the converting unit, to send the detected output ATM cell to the controlling unit, to remove the intra-apparatus header from the output ATM cell received from the converting unit, and to send the resultant ATM cell to a path in which the ATM cell is merged; and causing the controlling unit to perform a process corresponding to information of the control cell in the output ATM cell received from the root IF unit, to generate a response cell that contains the input path identification information and information of the process result corresponding to the input path identification information and the leaf IF unit number contained in the intra-apparatus header of the control cell, and to send the response cell to a leaf IF unit having the leaf IF unit number so as to send the response cell to a path identified by the input path identification information.

21. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add a first intra-apparatus header containing the input path identification information and the leaf IF unit number to the input ATM cell, generating an output ATM cell, and to send the output ATM cell to the root IF unit having the root IF unit number obtained from the path designation header conversion table;

causing the root IF unit to detect an output ATM cell that contains a control cell to be sent to the controlling unit from output ATM cells that contain the first intra-apparatus header and are received from the converting unit, to send the detected output ATM cell to the controlling unit, to remove the first intra-apparatus header from the output ATM cell received from the converting unit, and to send the resultant ATM cell to a path in which the ATM cell is merged, causing the controlling unit to perform a process corresponding to information of the control cell in the output ATM cell received from the root IF unit, to generate a first response cell that contains information of the process result that is the input path identification information contained in a path information storing area corresponding to the input path identification information and a leaf IF unit number contained in the first intra-apparatus header added to the control cell, to add a second intra-apparatus header that contains the leaf IF unit number and predetermined routing command information to the first response cell, to generate a second response cell, and to send the second response cell to the root IF unit;

causing the root IF unit to send the second response cell to the converting unit after receiving the second response cell; and causing the converting unit to send the first response cell to a leaf IF unit identified by the leaf IF unit number corresponding to the predetermined routing command information and a leaf IF unit number contained in the second intra-apparatus header of the second response cell after receiving the second response cell so as to send the response cell to a path identified by the input path identification information.

22. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add a first intra-apparatus header containing the input path identification information and the leaf IF unit number to the input ATM cell, to generate an output ATM cell, and to send the output ATM cell to the root IF unit having the root IF unit number obtained from the path designation header conversion table;

causing the root IF unit to detect an output ATM cell that contains a control cell to be sent to the controlling unit from output ATM cells that contain the first intra-apparatus header and are received from the converting unit and sending the detected output ATM cell to the controlling unit, to remove the intra-apparatus header from the output ATM cell received from the converting unit, and to send the resultant ATM cell to a path in which the ATM cell is merged;

causing the controlling unit to perform a process corresponding to information of the control cell in the output ATM cell received from the root IF unit, to generate a first response cell that contains information of the process result that is the input path identification information contained in a path information storing area corresponding to the input path identification information and a leaf IF unit number contained in the first intra-apparatus header added to the control cell, to add a second intra-apparatus header that contains the leaf IF unit number, the input path identification information, and predetermined routing command information to the first response cell, to generate a second response cell, and to send the second response cell to the root IF unit;

causing the root IF unit to send the second response cell to the converting unit after receiving the second response cell;

causing the converting unit to send the first response cell to a leaf IF unit identified by the leaf IF unit number corresponding to the predetermined routing command information and a leaf IF unit number contained in the second intra-apparatus header of the second response cell after receiving the second response cell; and causing the leaf IF unit to send the second response cell to a path identified by the input path identification information contained in the second intra-apparatus header after receiving the second response cell.

23. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add an intra-apparatus header containing the input path identification information and the leaf IF unit number to the input ATM cell, to generate an output ATM cell, and to send the output ATM cell to the root IF unit having the root IF unit number obtained from the path designation header conversion table;

causing the root IF unit to detect an output ATM cell that contains a control cell from output ATM cells that are received from the converting unit, to send the detected output ATM cell to the control cell rewriting unit, to remove the intra-apparatus header from the output ATM cell received from the converting unit, to send the resultant ATM cell to a path in which the ATM cell is merged, to send only information for controlling the path merging type communication apparatus of the information contained in the control cell to the controlling unit, to store input path identification information and a leaf IF unit number contained in an intra-apparatus header of the control cell, to receive information against the control result from the controlling unit, to generate a first response cell containing the leaf IF unit number, the input path identification information, and information of the process result corresponding to information of the received control result and the input path identification information and the leaf IF unit number contained in the intra-apparatus header, and to send the first response cell to a leaf IF unit identified by the leaf IF unit number through the converting unit;

causing the controlling unit to perform a process corresponding to the control information received from the control cell rewriting unit and to send the control result to the control cell rewriting unit, and causing the leaf IF unit to send a second response cell of which the leaf IF unit number is removed from the first response cell to a path identified by the input path identification information.

24. A path merging communication method for used in a path merging type communication apparatus having a plurality of leaf interface (IF) units for receiving ATM cells from different paths, a converting unit, connected to the leaf IF units, for receiving the input ATM cells from the different paths, merging the ATM cells, and designating one path to which the merged ATM cells are sent corresponding to a predetermined manner, a controlling unit, connected to the converting unit, for controlling the apparatus and control information, and a root IF unit, connected to the converting unit and the controlling unit, for sending the ATM cells merged by the converting unit to the path designated by the converting unit, the method comprising the steps of:

causing the converting unit to extract input path identification information and a leaf IF unit number for identifying a leaf IF unit from which the input ATM cell is received from the input ATM cell, to convert the input path identification information and the leaf IF unit number into output path identification information for identifying an output destination of the input ATM cell and a root IF unit number for identifying the root IF unit to which the input ATM cell is sent, to rewrite the input path identification information contained in a path information storing area of the input ATM cell to the output path identification information obtained from the path designation header conversion table, to add an intra-apparatus header containing the input path identification information and the leaf IF unit number to the input ATM cell, to generate an output ATM cell, and to send the output ATM cell to the root IF unit having the root IF unit number obtained from the path designation header conversion table;

causing the root IF unit to detect an output ATM cell that contains a control cell from output ATM cells that are received from the converting unit, to send the detected output ATM cell to the control cell rewriting unit, to remove the intra-apparatus header from the output ATM cell received from the converting unit, to send the resultant ATM cell to a path in which the ATM cell is merged, to sending only information for controlling the path merging type communication apparatus of the information contained in the control cell, to send input path identification information and a leaf IF unit number contained in an intra-apparatus header of the control cell to the controlling unit, to receive information against the control result from the controlling unit, to generate a first response cell containing the leaf IF unit number, the input path identification information, and information of the process result corresponding to information of the received control result and the input path identification information and the leaf IF unit number contained in the intra-apparatus header, and to send the first response cell to the converting unit;

causing the controlling unit to perform a process corresponding to the control information received from the control cell rewriting unit and to send the control result to the control cell rewriting unit; and causing the converting unit to send a second response of which the leaf IF unit number is removed from the first response cell to a leaf IF unit identified by the leaf IF unit number so as to send the response cell to a path identified by the input path identification information.

25. A computer readable storage medium storing a program used to direct a computer to perform a process comprising the steps of: extracting input path identification information and a leaf IF unit number for identifying a leaf IF unit from which the input ATM cell is received from the input ATM cell; converting the input path identification information and the leaf IF unit number into output path identification information for identifying an output destination of the input ATM cell and a root IF unit number for identifying the root IF unit to which the input ATM cell is sent; rewriting the input path identification information contained in a path information storing area of the input ATM cell to the output path identification information; adding an intra-apparatus header containing the input path identification information and the leaf IF unit number to the input ATM cell; generating an output ATM cell; sending the output ATM cell to the root IF unit with the root IF unit number; detecting an output ATM cell that contains a control cell to be sent to a controlling unit from output ATM cells that are created in the converting step; sending the detected output ATM cell to the controlling unit; removing the intra-apparatus header from the output ATM cell; sending the resultant ATM cell to a path in which the ATM cell is merged; performing a process corresponding to information of the control cell in the out ATM cell received from the root IF unit; generating a response cell that contains the input path identification information and information of the process result corresponding to the input path identification information and the leaf IF unit number contained in the intra-apparatus header of the control cell; sending the response cell to a leaf IF unit having the leaf IF unit number; and sending the response cell from the leaf IF unit to a path identified by the input path identification information.

* * * * *